United States Patent
Veit et al.

(10) Patent No.: US 7,513,356 B2
(45) Date of Patent: Apr. 7, 2009

(54) POSITIVE DISPLACEMENT SORTER

(75) Inventors: Frank W. Veit, Spring Lake, MI (US);
Rhonda J. Verploegen, Sparta, MI (US);
Thanh V. Nguyen, Wyoming, MI (US);
Mark S. Harkema, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 12/112,672

(22) Filed: Apr. 30, 2008

(65) Prior Publication Data

US 2008/0202893 A1   Aug. 28, 2008

Related U.S. Application Data

(62) Division of application No. 11/532,335, filed on Sep. 15, 2006, now abandoned, which is a division of application No. 11/057,010, filed on Feb. 11, 2005, now Pat. No. 7,117,988, which is a division of application No. 10/248,981, filed on Mar. 6, 2003, now Pat. No. 6,860,383.

(60) Provisional application No. 60/362,415, filed on Mar. 7, 2002, provisional application No. 60/368,881, filed on Mar. 29, 2002, provisional application No. 60/446,048, filed on Feb. 7, 2003.

(51) Int. Cl.
*B65G 23/44* (2006.01)
*B65G 47/34* (2006.01)

(52) U.S. Cl. .............. 198/370.02; 198/812; 193/35 TE

(58) Field of Classification Search .......... 198/370.01, 198/370.02, 370.07, 370.1, 812; 193/35 TE
See application file for complete search history.

(56) References Cited

U.S. PATENT DOCUMENTS 2,648,423 A   8/1953   Black ................. 198/833

(Continued)

FOREIGN PATENT DOCUMENTS

DE   3412995 A1   10/1985

(Continued)

OTHER PUBLICATIONS

Hesselink (Verploegen), Rhonda J. (inventor in present application), undergraduate thesis entitled "Theoretical and Practical Application of Linear Motors in Linear Positive Package Sorting Machines," Jun. 2000.

(Continued)

*Primary Examiner*—Douglas A Hess
(74) *Attorney, Agent, or Firm*—Van Dyke, Gardner, Linn & Burkhart, LLP

(57) ABSTRACT

A positive displacement sorter apparatus includes a plurality of interconnected slats defining an endless traveling web. An upper run of the web defines a first conveying surface traveling in a longitudinal direction. A plurality of pusher shoes are provided, each moving along at least one of the slats to laterally displace an article on said conveying surface. A web end portion of the web is extendable and contractible in the longitudinal direction. A product handling conveyor at the web end portion has a second conveying surface that is adapted to supply product to, or receive product from, the first conveying surface. The product handling conveyor has a conveyor end portion that is adjacent to the web and is moveable with extension and contraction of the web end portion. In this manner, the first and second conveying surfaces maintain a constant relative relationship.

23 Claims, 25 Drawing Sheets

U.S. PATENT DOCUMENTS

| | | | |
|---|---|---|---|
| 3,361,247 A | 1/1968 | Lauzon et al. | 198/38 |
| 3,426,887 A | 2/1969 | Ward et al. | 198/177 |
| 3,647,050 A | 3/1972 | Neal | 198/815 |
| 3,788,447 A | 1/1974 | Stephanoff | 198/41 |
| 3,807,314 A | 4/1974 | Siemmons | 104/148 R |
| 4,138,008 A | 2/1979 | Del Rosso | 198/365 |
| 4,513,858 A * | 4/1985 | Fellner et al. | 198/812 |
| 4,526,271 A | 7/1985 | Finnighan | 198/648 |
| 4,576,276 A | 3/1986 | Boltrek et al. | 198/332 |
| 4,675,582 A | 6/1987 | Hommes et al. | 318/38 |
| 4,717,011 A | 1/1988 | Yu et al. | 198/365 |
| 4,732,259 A | 3/1988 | Yu et al. | 198/365 |
| 4,732,260 A | 3/1988 | Canziani | 198/365 |
| 4,738,347 A | 4/1988 | Brouwer et al. | |
| 4,760,908 A | 8/1988 | Houghton | 198/365 |
| 4,770,291 A | 9/1988 | Shaw | 198/851 |
| 4,800,818 A | 1/1989 | Kawaguchi et al. | 104/290 |
| 4,817,779 A | 4/1989 | Beck et al. | |
| 4,896,760 A | 1/1990 | Triantafilou et al. | 198/365 |
| 4,932,515 A | 6/1990 | Stohr | 198/822 |
| 4,973,892 A | 11/1990 | Murata et al. | 318/135 |
| 5,038,912 A | 8/1991 | Cotter | 198/370 |
| 5,088,593 A | 2/1992 | Lewin | 198/619 |
| 5,127,510 A | 7/1992 | Cotter et al. | 198/372 |
| 5,131,522 A | 7/1992 | Fujio | 198/370 |
| 5,165,515 A | 11/1992 | Nitschke et al. | 198/349.95 |
| 5,167,315 A | 12/1992 | Doane | 198/362 |
| 5,172,803 A | 12/1992 | Lewin | 198/619 |
| 5,191,959 A | 3/1993 | Leemkuil | 198/365 |
| 5,199,548 A | 4/1993 | Tanaka et al. | 198/502.4 |
| 5,218,277 A | 6/1993 | Pattison et al. | 318/135 |
| 5,285,886 A | 2/1994 | Ostholt, Rudiger et al. | 198/370 |
| 5,295,568 A | 3/1994 | Saito et al. | 198/330 |
| 5,333,715 A | 8/1994 | Sapp | 198/372 |
| 5,407,061 A * | 4/1995 | Okada et al. | 198/812 |
| 5,409,095 A | 4/1995 | Hoshi | 198/372 |
| 5,427,223 A | 6/1995 | van den Goor | 198/365 |
| 5,435,429 A | 7/1995 | van den Goor | 198/890.1 |
| 5,588,520 A | 12/1996 | Affaticati et al. | 198/370.06 |
| 5,613,591 A | 3/1997 | Heit et al. | 198/370.02 |
| 5,636,728 A * | 6/1997 | Best et al. | 198/782 |
| 5,657,858 A | 8/1997 | van den Goor | 198/890 |
| 5,732,814 A | 3/1998 | Owczarzak et al. | 198/890 |
| 5,909,797 A | 6/1999 | van den Goor | 198/370.02 |
| 5,927,466 A | 7/1999 | Rowley | 198/370.03 |
| 5,967,289 A | 10/1999 | Kelsey | 198/370.02 |
| 5,975,277 A | 11/1999 | Skarlupka | 198/370.04 |
| 6,003,658 A * | 12/1999 | Best et al. | 198/588 |
| 6,139,240 A | 10/2000 | Ando | 414/267 |
| 6,292,710 B1 | 9/2001 | Bonnet | 700/230 |
| 6,481,559 B1 | 11/2002 | Maeda et al. | |
| 6,513,642 B1 | 2/2003 | Shearer et al. | 198/370.02 |
| 6,513,649 B1 | 2/2003 | Lauzon et al. | 198/832.1 |
| 6,615,972 B2 | 9/2003 | Veit et al. | |
| 6,659,264 B2 * | 12/2003 | Pelka | 198/456 |
| 6,814,216 B2 | 11/2004 | Veit et al. | |
| 6,823,985 B2 * | 11/2004 | Gilmore et al. | 198/588 |
| 6,860,383 B2 | 3/2005 | Veit et al. | 198/815 |
| 6,866,136 B2 | 3/2005 | Veit et al. | 198/370.02 |
| 6,974,019 B2 * | 12/2005 | Lapeyre et al. | 198/370.02 |
| 7,086,519 B2 | 8/2006 | Veit et al. | 198/370.02 |
| 7,090,071 B2 * | 8/2006 | Enomoto | 198/841 |
| 7,117,988 B2 | 10/2006 | Veit et al. | |
| 7,168,555 B2 * | 1/2007 | Peterson | 198/812 |
| 7,395,918 B2 * | 7/2008 | Thompson | 198/812 |
| 2007/0007108 A1 | 1/2007 | Veit et al. | |

FOREIGN PATENT DOCUMENTS

| | | |
|---|---|---|
| DE | 2745298 C2 | 1/1987 |
| DE | 4342851 C2 | 9/1995 |
| DE | 19852926 A1 | 5/2000 |
| EP | 0212027 A1 | 3/1987 |
| EP | 0444734 B1 | 5/1994 |
| EP | 0700844 A2 | 3/1996 |
| EP | 0602694 B1 | 3/1998 |
| EP | 0648694 B1 | 12/1998 |
| EP | 0792824 | 7/2000 |
| GB | 2057381 A | 4/1981 |
| GB | 2242409 A | 10/1991 |
| JP | 57-112223 | 7/1982 |
| JP | 2-86923 | 7/1990 |
| JP | 4-223921 | 8/1992 |
| JP | 07-61570 | 3/1995 |
| JP | 7-315561 | 12/1995 |
| JP | 7-323911 | 12/1995 |
| JP | 820429 | 1/1996 |
| JP | 8-319021 | 12/1996 |
| JP | 9-52621 | 2/1997 |
| JP | 9-110149 | 4/1997 |
| JP | 9-183517 | 7/1997 |
| JP | 9-183518 | 7/1997 |
| JP | 9-290914 | 11/1997 |
| JP | 11-193128 | 7/1999 |
| JP | 0-103518 | 4/2000 |
| JP | 0-118699 | 4/2000 |
| WO | WO 00/41956 | 7/2000 |
| WO | 00/48739 | 8/2000 |
| WO | 00/68125 | 11/2000 |
| WO | WO 01/83342 A1 | 11/2001 |

OTHER PUBLICATIONS

Search Report from corresponding Patent Cooperation Treaty application No. PCT/US03/07314, dated Aug. 27, 2003.

Title: Conveyor System With Lateral Motion Capability (Inventor: A. Kimura), Oct. 1986, Japan.

Photograph taken from a lateral side of a pusher shoe which surrounds a corresponding slat. The corresponding slat is not shown, but has an outer surface configuration that substantially conforms to the interior surface of the illustrated shoe. The shoe in the photograph should be considered prior art under 35 U.S.C. § 102(b) to the present application.

* cited by examiner

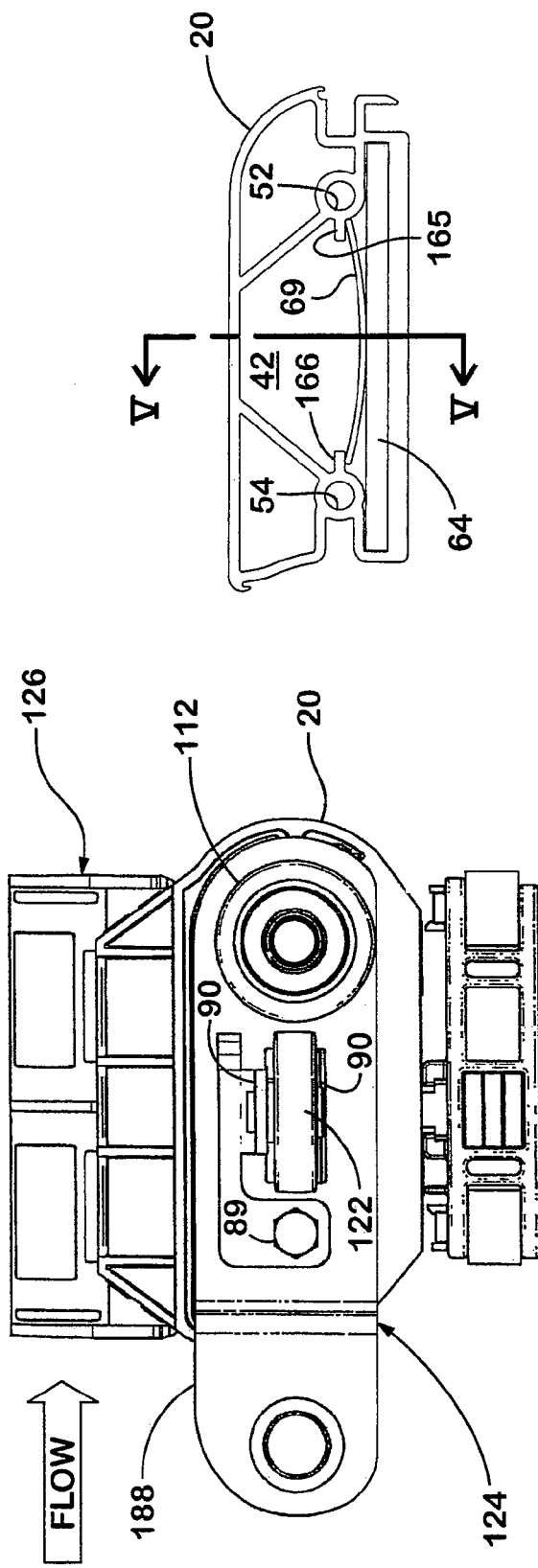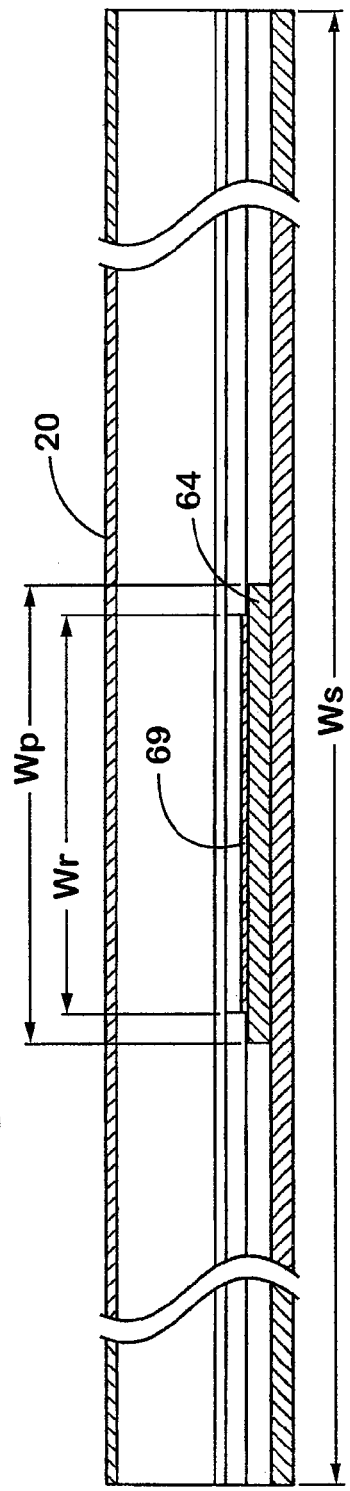

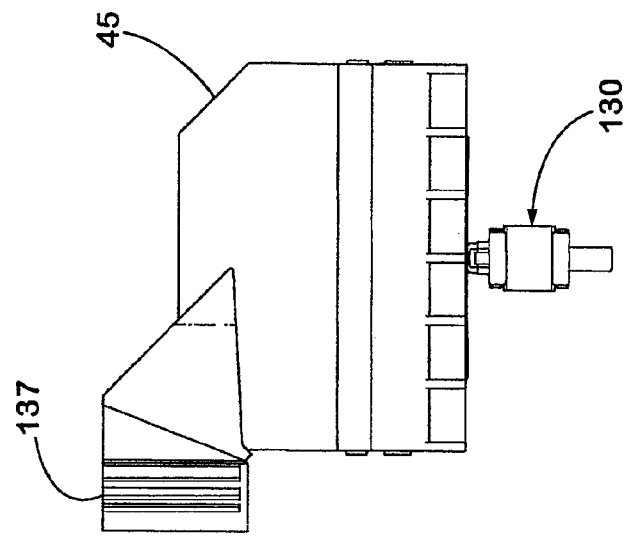
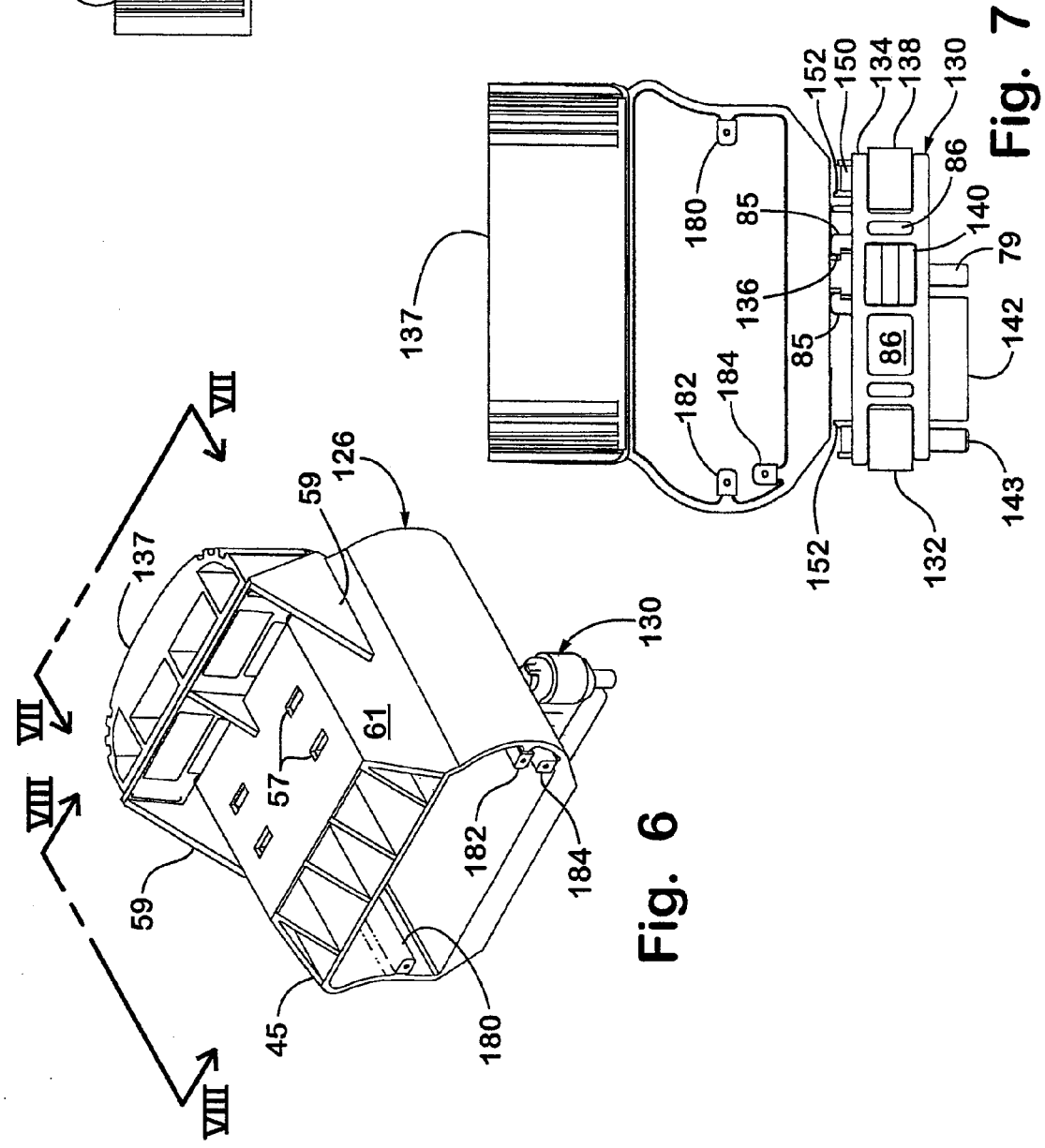

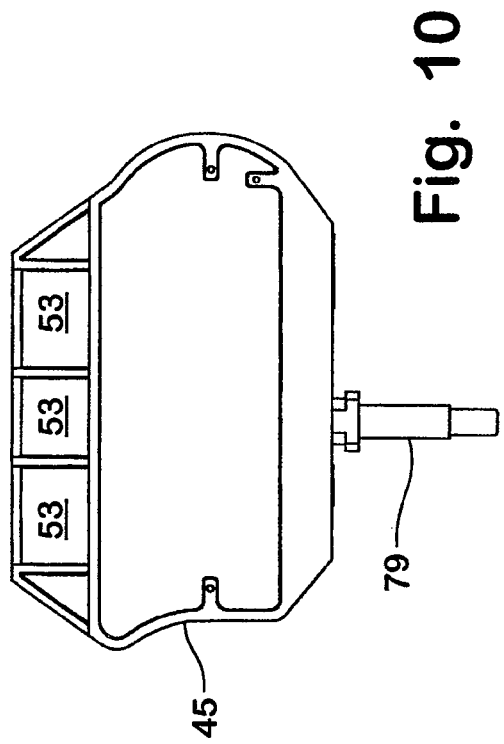
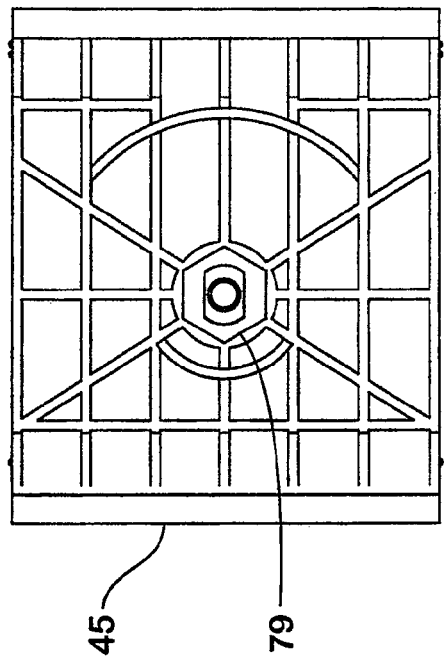
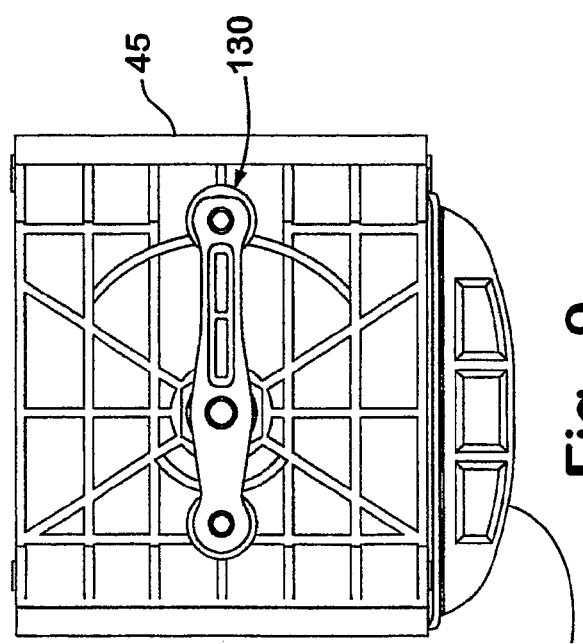
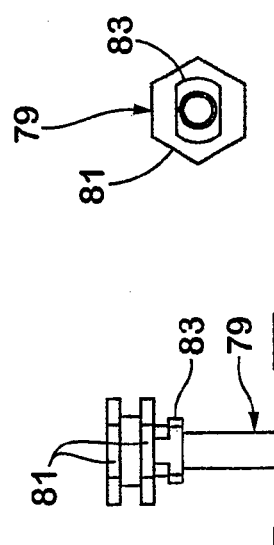
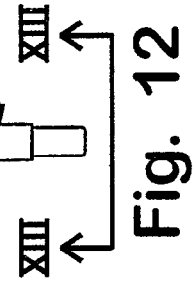

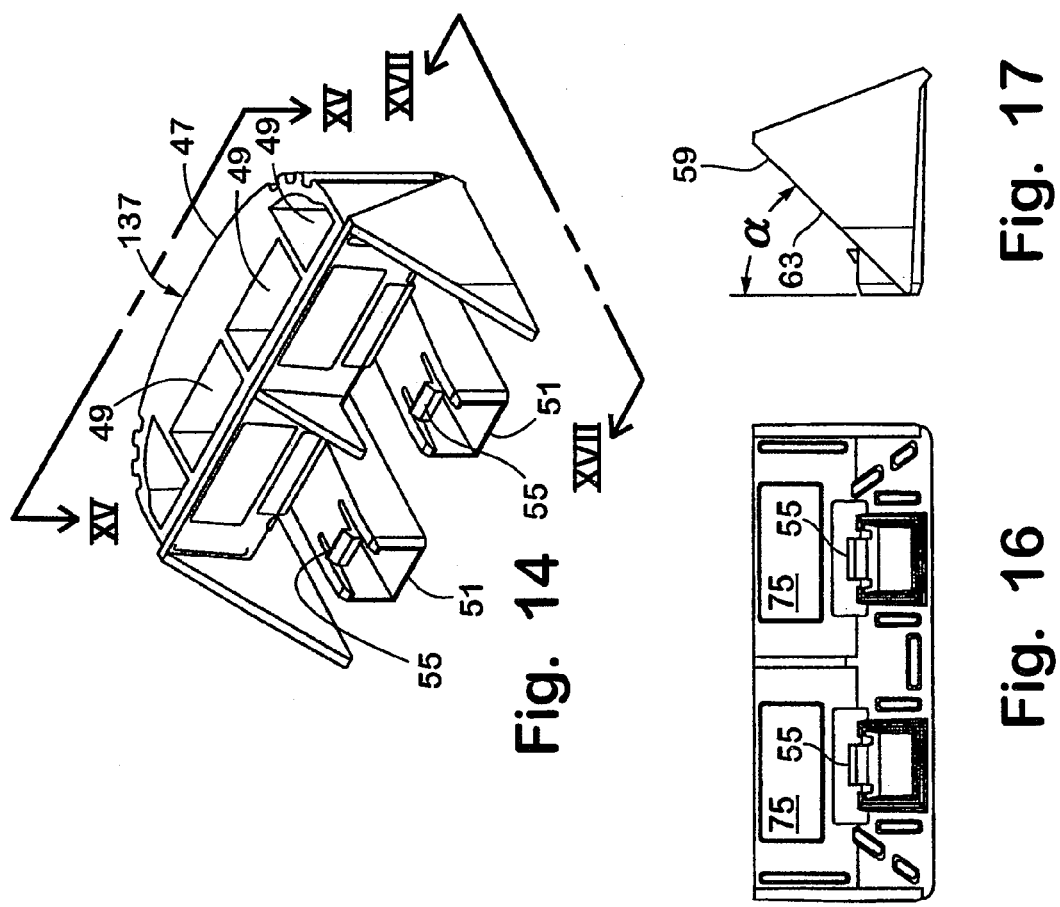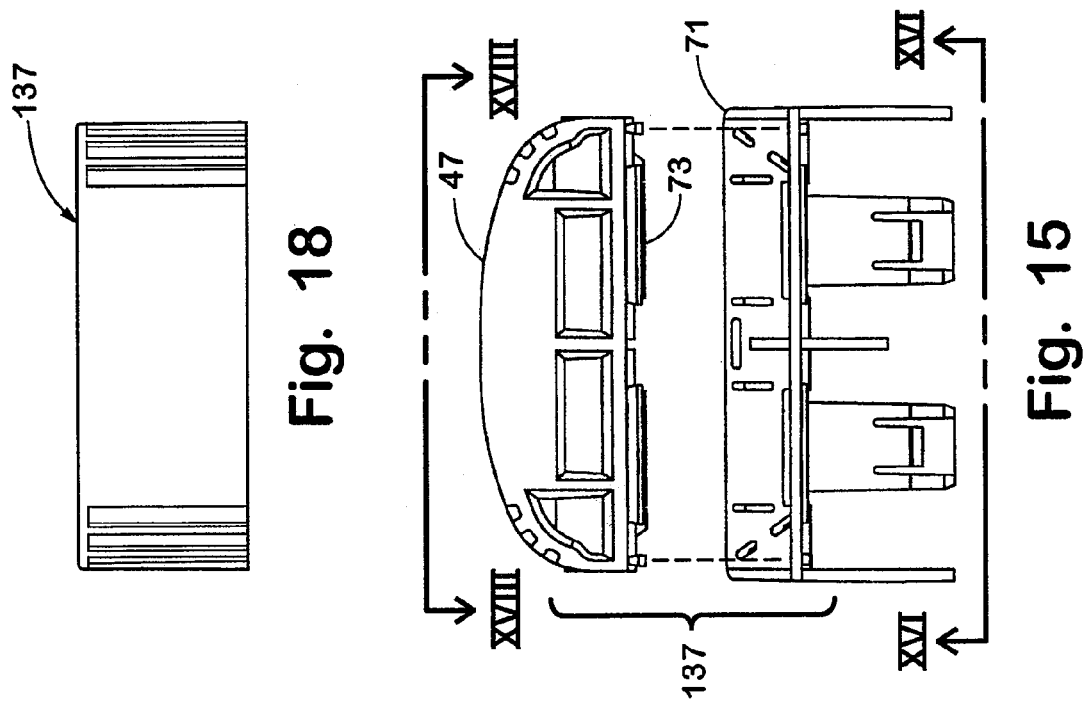

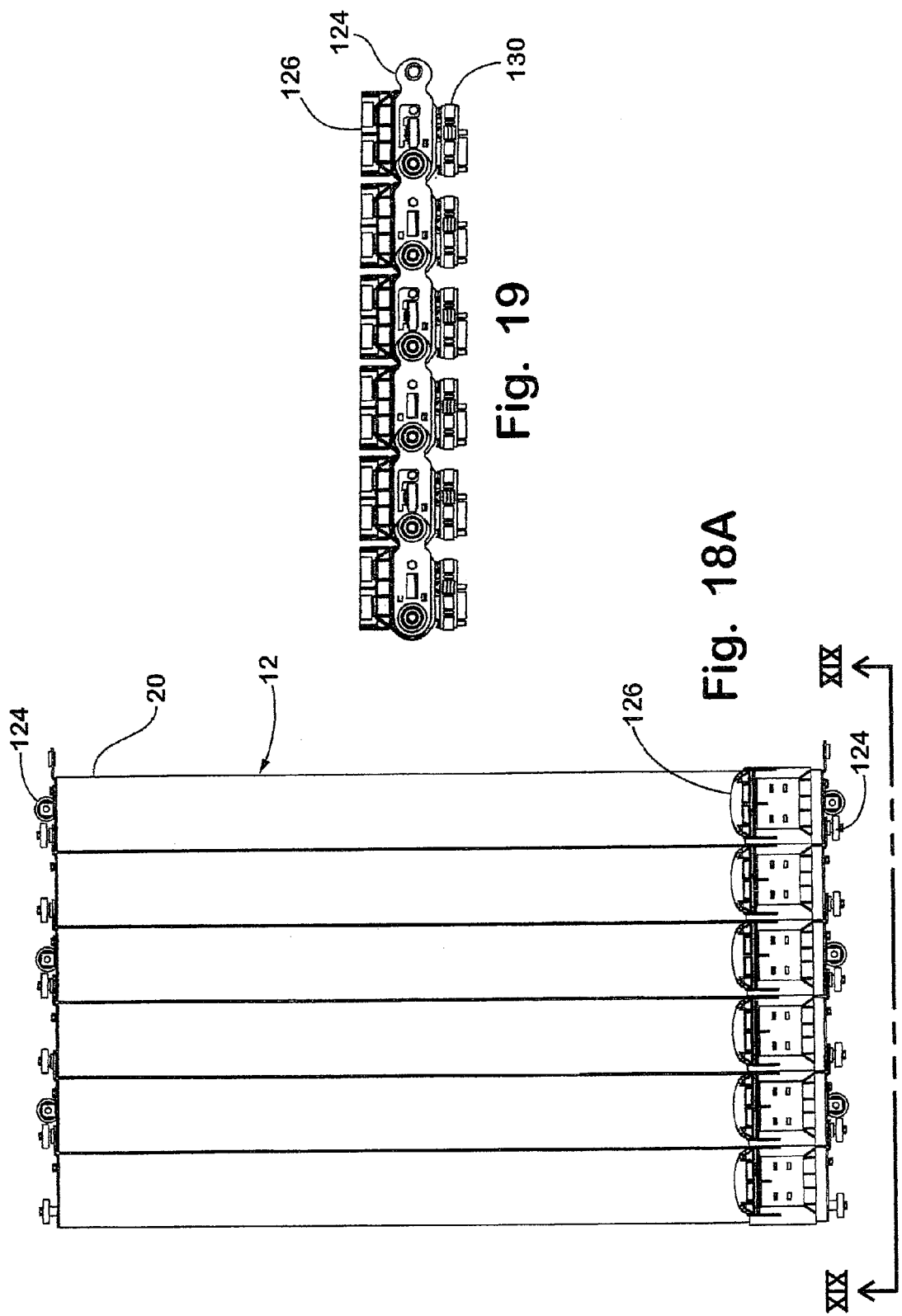

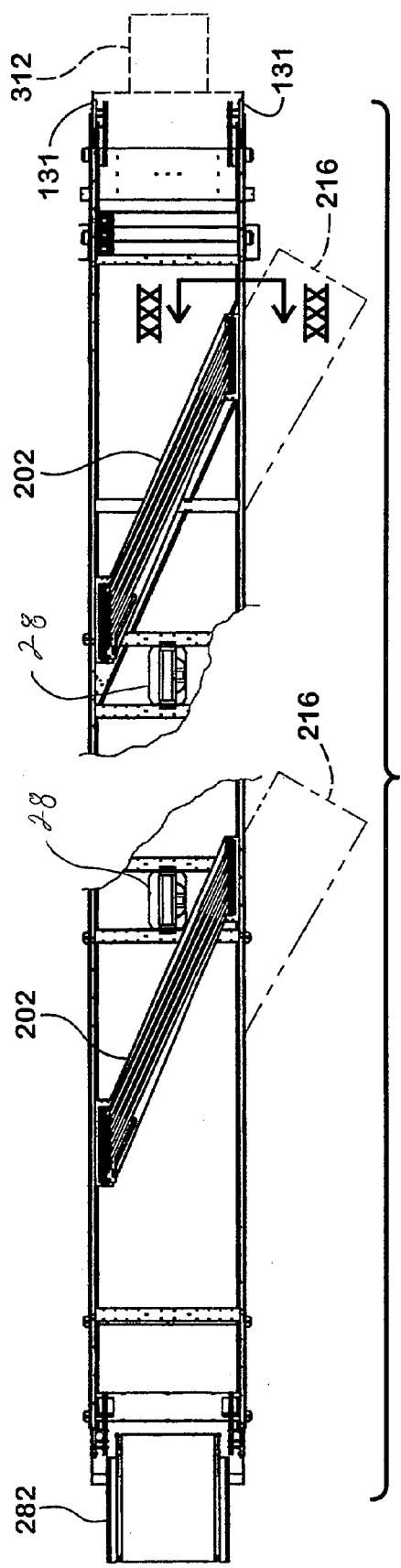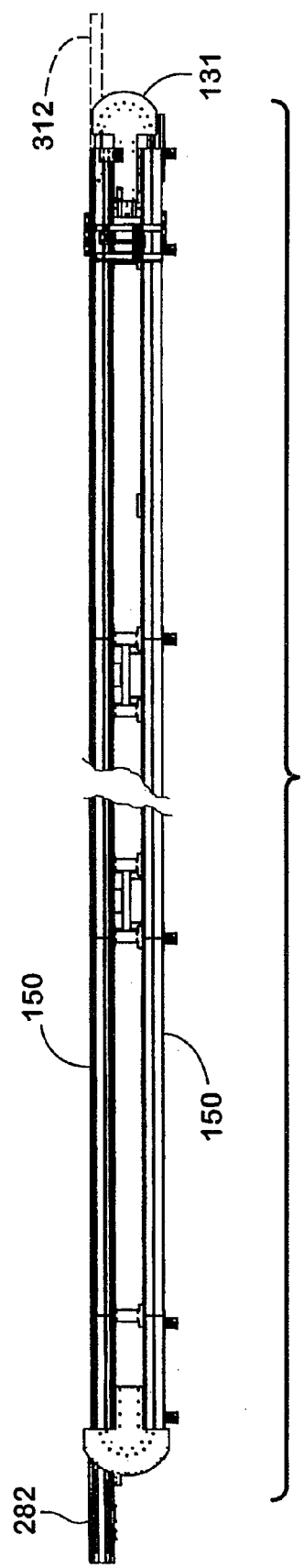

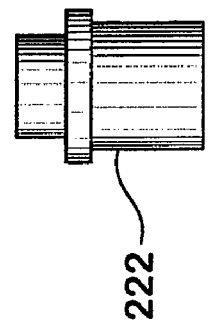
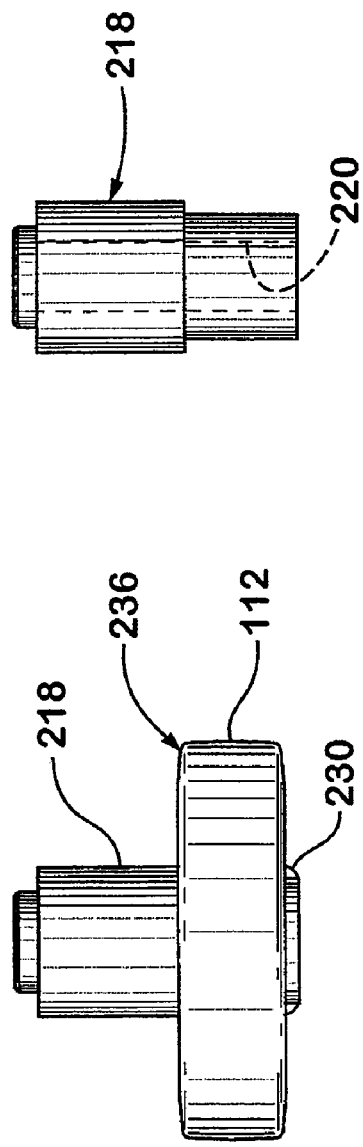
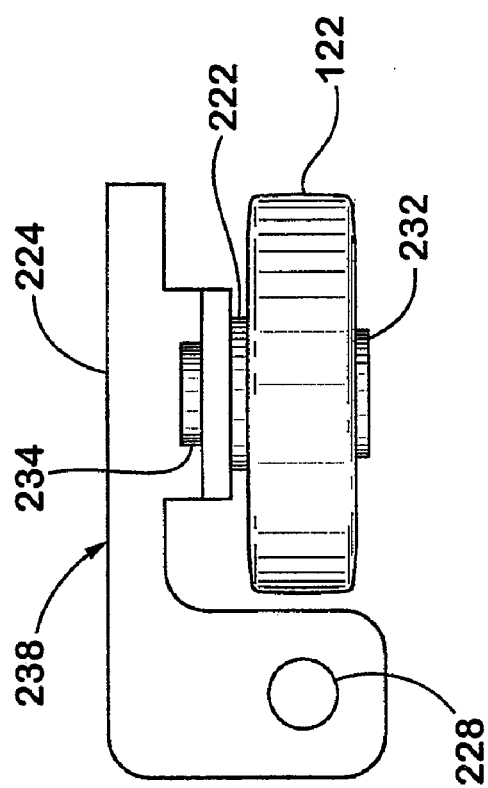

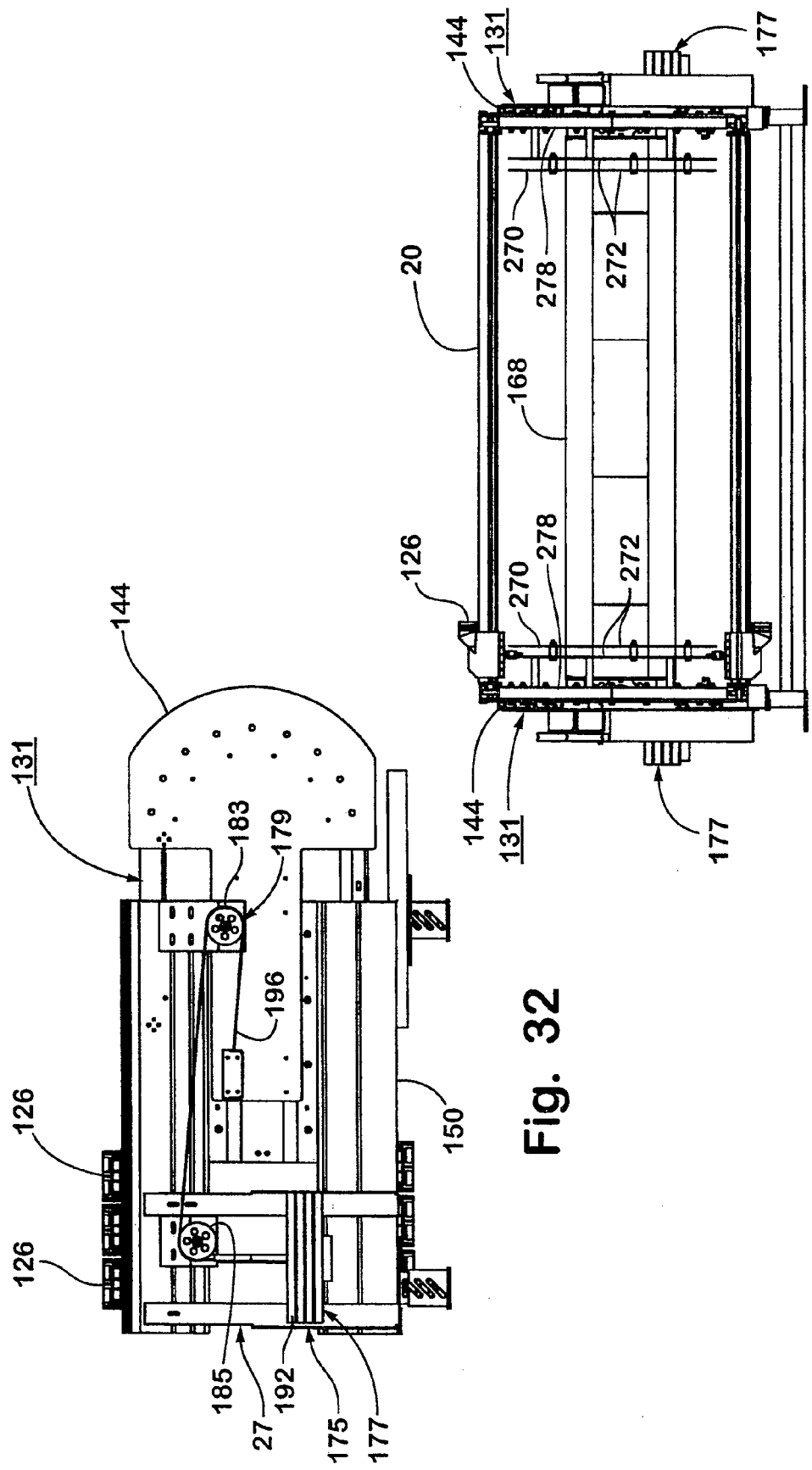

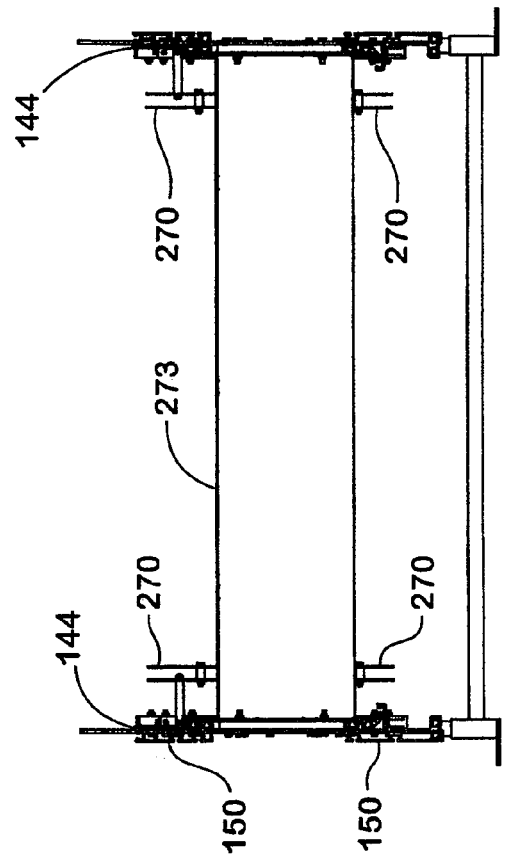
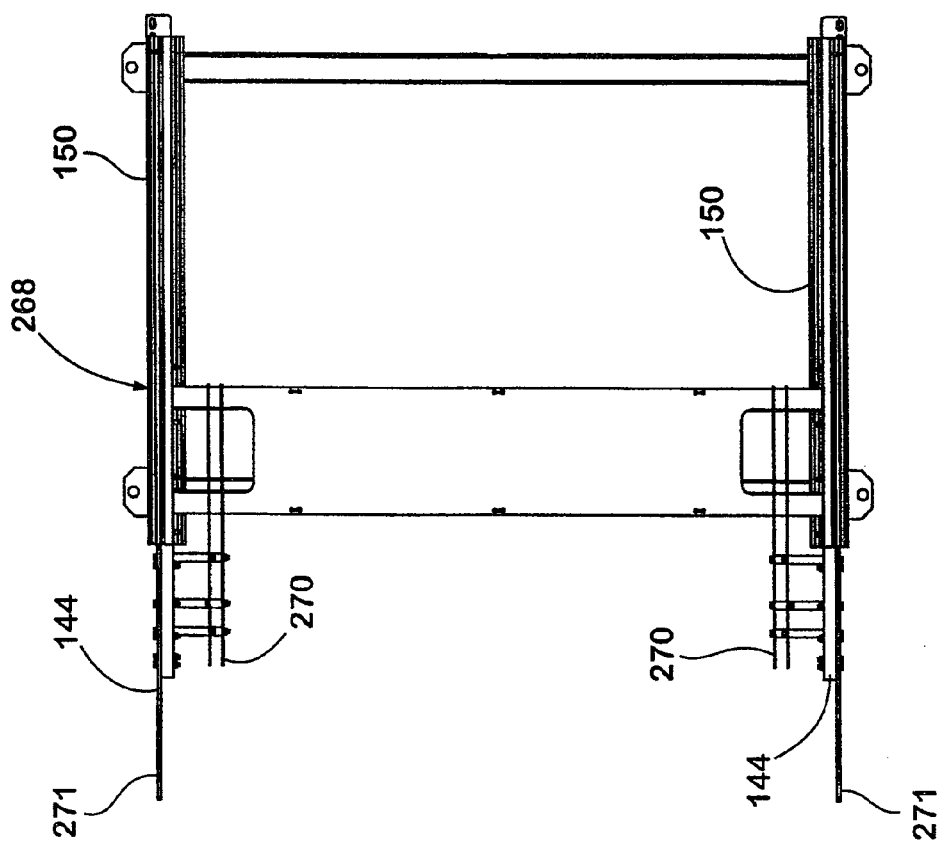
Fig. 36
Fig. 35

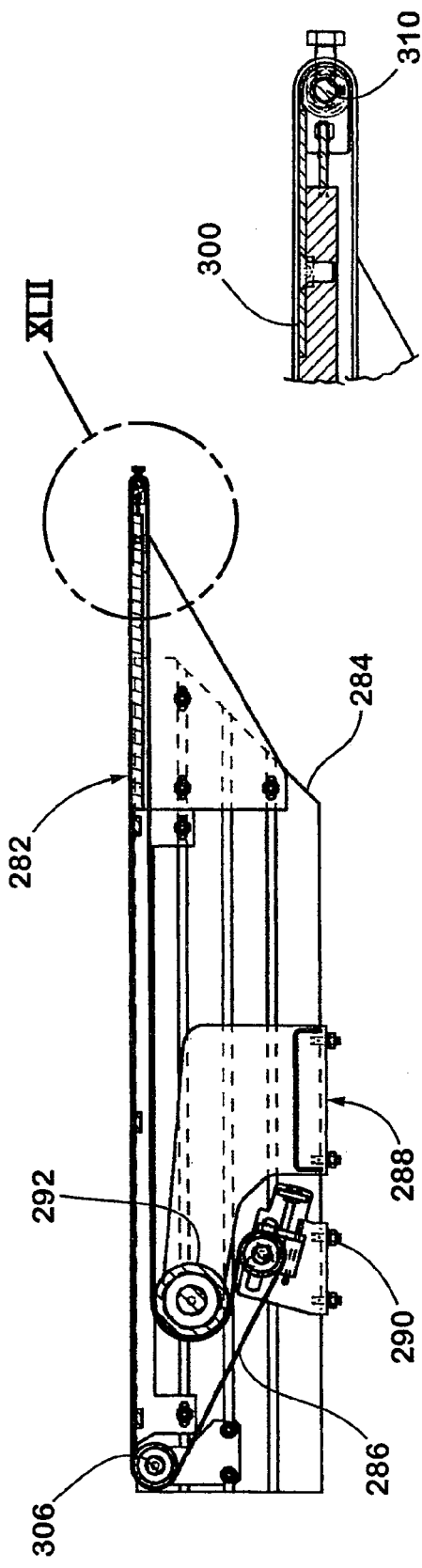
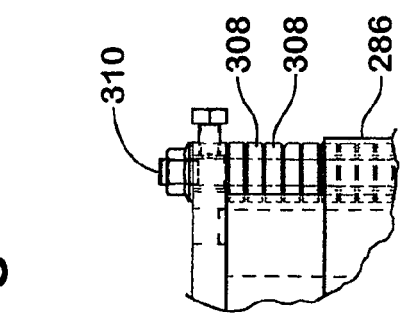
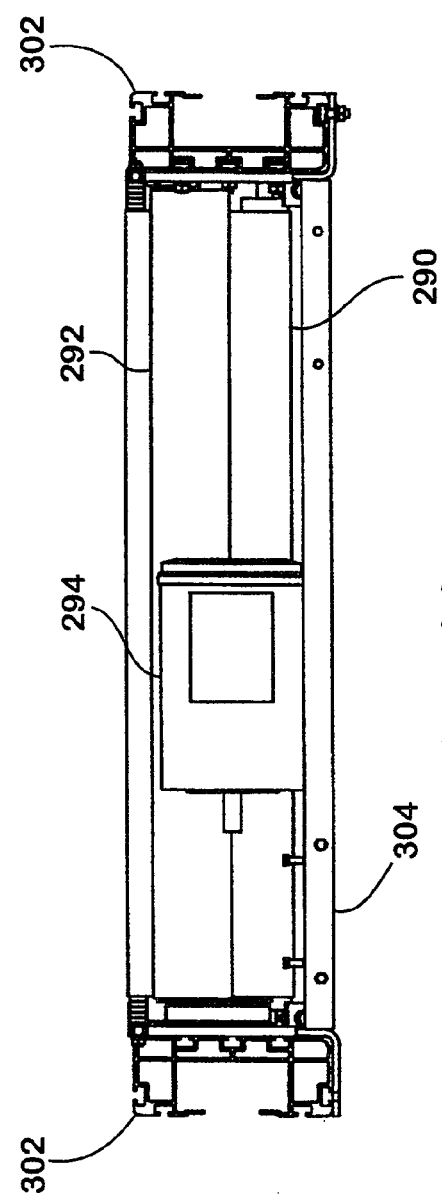
Fig. 41
Fig. 42
Fig. 43
Fig. 44

POSITIVE DISPLACEMENT SORTER

CROSS-REFERENCE TO RELATED APPLICATIONS

This application is a division of pending prior U.S. patent application Ser. No. 11/532,335, filed on Sep. 15, 2006; which is a division of U.S. patent application Ser. No. 11/057, 010, filed on Feb. 11, 2005, now U.S. Pat. No. 7,117,988; which is a division of U.S. patent application Ser. No. 10/248, 981, filed on Mar. 6, 2003, now U.S. Pat. No. 6,860,383; which claims priority from U.S. provisional patent application Ser. No. 60/362,415, filed on Mar. 7, 2002; U.S. provisional patent application Ser. No. 60/368,881, filed on Mar. 29, 2002; and U.S. provisional patent application Ser. No. 60/446,048, filed on Feb. 7, 2003, the disclosures of which are hereby incorporated herein by reference in their entirety.

BACKGROUND OF THE INVENTION

This invention relates generally to conveyor sortation systems and, in particular, to a positive displacement sorter of the pusher shoe and slat configuration.

Positive displacement sortation conveyors are known having a main conveying surface and diverter shoes that are generally used to displace articles laterally on the main conveying surface, such as when the articles are to be diverted upon one or more spur conveyor lines typically placed at an angle to the main conveying surface. Such conveyors may include a pair of endless chains and a plurality of members, such as slats, connected at their opposite ends to the chains in order to provide a moving conveyor surface. Each slat, or a pair of slats, is fitted with a pusher or diverter shoe mounted in a manner such that the shoe moves laterally across the slat(s). Movement of the shoe is guided by a guide track beneath the conveying surface. At the loading end of the sortation system, the shoes have a particular orientation with respect to the conveying surface. When an article is to be diverted to a particular spur line, a diverter assembly is actuated to switch shoes adjacent the article onto one or more diagonal tracks causing the effected shoes to glide across the slats to divert the article. Examples of such positive displacement sorters include commonly assigned U.S. Pat. Nos. 4,738,347 and 5,127,510. Other examples include U.S. Pat. Nos. 3,361,247; 5,409,095; and 4,884,677; and European Published Patent Application Nos. EP 0 602 694 B1 and EP 0 444 734 A1.

In many instances, sortation conveyors are driven by rotary motors operatively connected to sprockets, which propel the chains. As the application in which the sortation conveyors are used becomes increasing large, the size of the rotary motors must correspondingly increase in order to provide sufficient power to propel the longer conveying surface, as well as achieve the desired throughput. As the size of the motors and sprockets increases in order to meet the additional power requirements, the noise issued from the rotary motor, as well as the sizes of the sprockets and chains, correspondingly increase.

There is a long-felt need to increase the throughput of conveyor systems. Sortation conveyors and their associated induction conveyors are often the most challenging portion of the conveyor system to handle increasing demands for article throughput. Increase in throughput can be achieved by increasing the speed of the conveying surface. However, there are difficulties in continuously increasing the speed of the conveying surface. Another way to increase throughput is to decrease the gap between articles while ensuring sufficient gap to allow the articles to be properly diverted to their destination spur.

SUMMARY OF THE INVENTION

A positive displacement sorter apparatus, according to the invention, includes a plurality of interconnected slats defining an endless web, an upper run of the web defining a conveying surface. A plurality of pusher shoes are provided, each moving along at least one of the plurality of slats to laterally displace articles on the conveying surface.

According to an aspect of the invention, each of the pusher shoes includes a diverting assembly. The diverting assembly includes an article-contacting member. The article-contacting member is flexible, thereby cushioning impact with articles being diverted.

According to another aspect of the invention, a linear motor propulsion system is provided for propelling the web. The linear propulsion system includes at least one motor primary and a plurality of motor secondaries. The motor secondaries include magnets placed within the slats. At least one elastic spring member is provided to position each of the magnetic plates within the associated one of the slats.

According to another aspect of the invention, a plurality of diverter rails are provided extending diagonally under the conveying surface. A plurality of diverters are provided that are associated with the diverting rails. At least one of the pusher shoes includes a base and a transfer assembly extending from the base below the conveying surface. At least one of the diverters includes an actuator for selecting actuating the transfer assembly toward the associated one of the diverting rails. The transfer assembly includes a toggle and a leading roller that is supported by the toggle that is selectively actuated by the actuator. The transfer assembly further includes a shaft that rotatably Supports the leading roller from the toggle. The shaft extends from the toggle in a direction opposite from the shoe base.

According to another aspect of the invention, the pusher shoes may include slat engagement portions that engage the slats at shoe-engaging portions. Each of the pusher shoes includes a body made of a first polymeric material and wear pads made of a different second polymeric material. The wear pads engage the slats at the engagement portions. The second polymeric material is self-lubricating.

According to another aspect of the invention, separate take-up assemblies are provided to substantially independently adjust opposite lateral sides of the web to maintain tension of the web.

According to another aspect of the invention, a moveable web support is provided and a product-handling conveyor at the web support supplies product to, or takes product away from, the conveying surface. The product-handling conveyor has a generally flexible body defining another conveying surface and has an end of the body moveable with the web support.

According to another aspect of the invention, a plurality of diverting rails extend diagonally under the conveying surface and include a plurality of diverters associated with the diverting rails. At least one of the pusher shoes includes a base and a transfer assembly extending from the base below the conveying surface. At least one of the diverters includes an actuator for selectively actuating the transfer assembly toward the associated one of the diverting rails. The diverting rails have terminal portions. The terminal portions and the transfer assemblies are configured to direct the transfer assembly in its longitudinal direction in a substantially continuous change of direction after moving pusher shoes laterally of the conveying surface. This reduces audible noise at the end of a divert.

According to another aspect of the invention, a support track network is provided and a wheel assembly moveably supports the endless web for movement on the support track network. The wheel assembly includes at least one wheel and at least one shaft rotatably supporting the at least one wheel. The at least one shaft is retained on the at least one shaft by a displaced, or deformed, portion of the at least one shaft.

According to a further aspect of the invention, the sorter apparatus includes a support track network and a wheel assembly moveably supporting the endless web for movement on the support track network. The support track network includes a frame member defining at least one vertical surface and at least one horizontal surface. These surfaces guide the wheel assembly. The sorter apparatus further includes a cover extending from the frame member in a direction opposite from the web.

According to another aspect of the invention, the sorter apparatus includes a feed conveyor feeding product to the conveying surface. The feed conveyor includes a frame, an endless conveyor belt supported at the frame and a drive assembly for driving the conveying belt. The drive assembly has an operating position. The conveyor belt may be fitted over the frame when the drive assembly is retracted from the operating position for replacement of the conveyor belt.

These and other objects, advantages and features of this invention will become apparent upon review of the following specification in conjunction with the drawings.

BRIEF DESCRIPTION OF THE DRAWINGS

FIG. 3 is a side elevation of the shoe and slat in FIG. 2;

FIG. 4 is a sectional view taken along the lines IV-IV in FIG. 2;

FIG. 5 is a sectional view taken along the lines V-V in FIG. 4;

FIG. 6 is a perspective view of a pusher shoe, according to the invention;

FIG. 7 is a view taken from VII-VII in FIG. 6;

FIG. 8 is a view taken from VIII-VIII in FIG. 6;

FIG. 9 is a bottom plan view of the pusher shoe in FIG. 6;

FIG. 10 is a side elevation of the pusher shoe base in FIG. 6 with the transfer assembly removed;

FIG. 11 is a bottom plan view of the pusher shoe base in FIG. 10;

FIG. 12 is a side view of a rotary coupling shaft;

FIG. 13 is a view taken from the lines XIII-XIII in FIG. 12;

FIG. 14 is a perspective view of a diverting assembly;

FIG. 15 is an exploded top view of the diverting assembly in FIG. 14 with components thereof separated in order to reveal details thereof;

FIG. 16 is a view taken along the lines XVI-XVI in FIG. 15;

FIG. 17 is a view taken along the lines XVII-XVII in FIG. 14;

FIG. 18 is a view taken along the lines XVIII-XVIII in FIG. 15;

FIG. 18a is a top plan view of a portion of the endless web of the sortation apparatus in claim 1;

FIG. 19 is a side elevation taken in the direction of lines XIX-XIX in FIG. 18a;

FIG. 20 is a top plan view of the sortation assembly in FIG. 1 with the slats removed to reveal internal details thereof;

FIG. 21 is a side elevation of the sortation assembly in FIG. 20;

FIG. 26 is a top plan view of a vertical wheel assembly;

FIG. 27 is a top plan view of a support axle for the wheel assembly in FIG. 26;

FIG. 28 is a side elevation of a horizontal wheel assembly;

FIG. 29 is a side elevation of an axle used in FIG. 28;

FIG. 32 is a side elevation taken in the direction XXXII-XXXII in FIG. 31;

FIG. 33 is an end elevation taken in the direction XXXIII-XXXIII in FIG. 31;

FIG. 35 is a top plan view of the frame assembly portion in FIG. 34;

FIG. 36 is a sectional view taken along the lines XXXVI-XXXVI in FIG. 4;

FIG. 41 is a sectional view taken along the lines XLI-XLI in FIG. 40;

FIG. 42 is an enlarged side elevation of area XLII in FIG. 41;

FIG. 43 is an enlarged plan view of area XLIII in FIG. 40;

FIG. 44 is an end elevation taken in a direction XLIV-XLIV in FIG. 40;

DESCRIPTION OF THE PREFERRED EMBODIMENT

Figure 1:
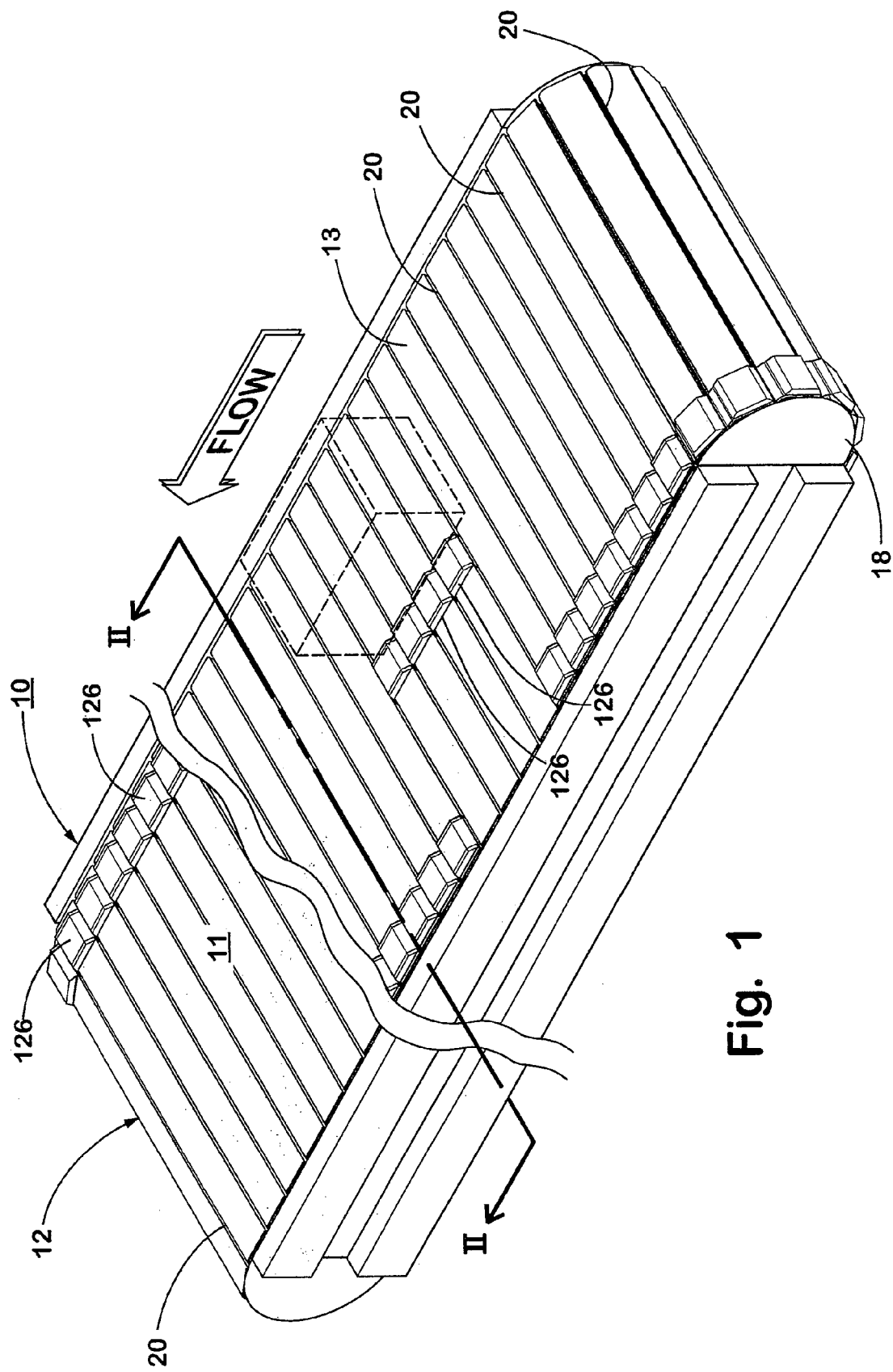
FIG. 1 is a perspective view of a positive displacement shoe and slat sorter assembly, according to the invention.
Figure 2:
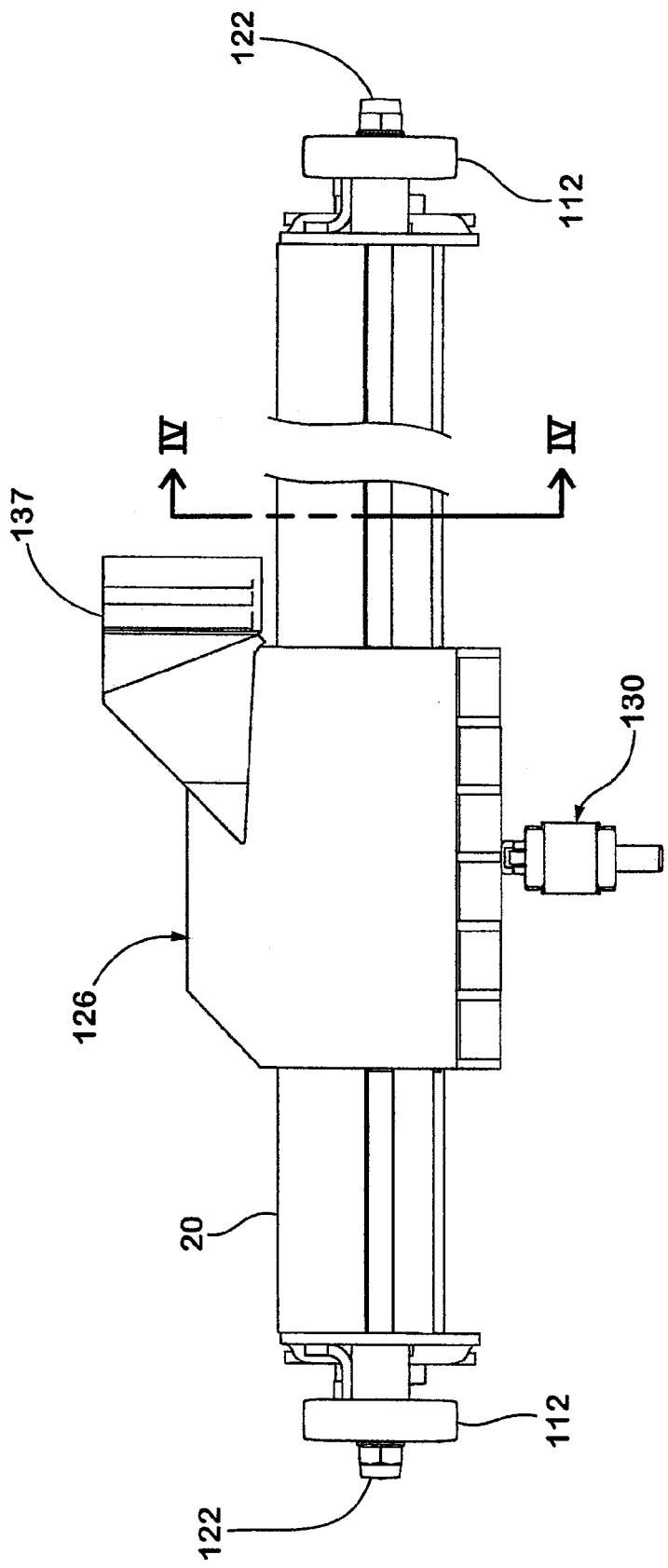
FIG. 2 is an end elevation of a shoe and slat combination taken along the lines II-II in FIG. 1.
Figure 22:
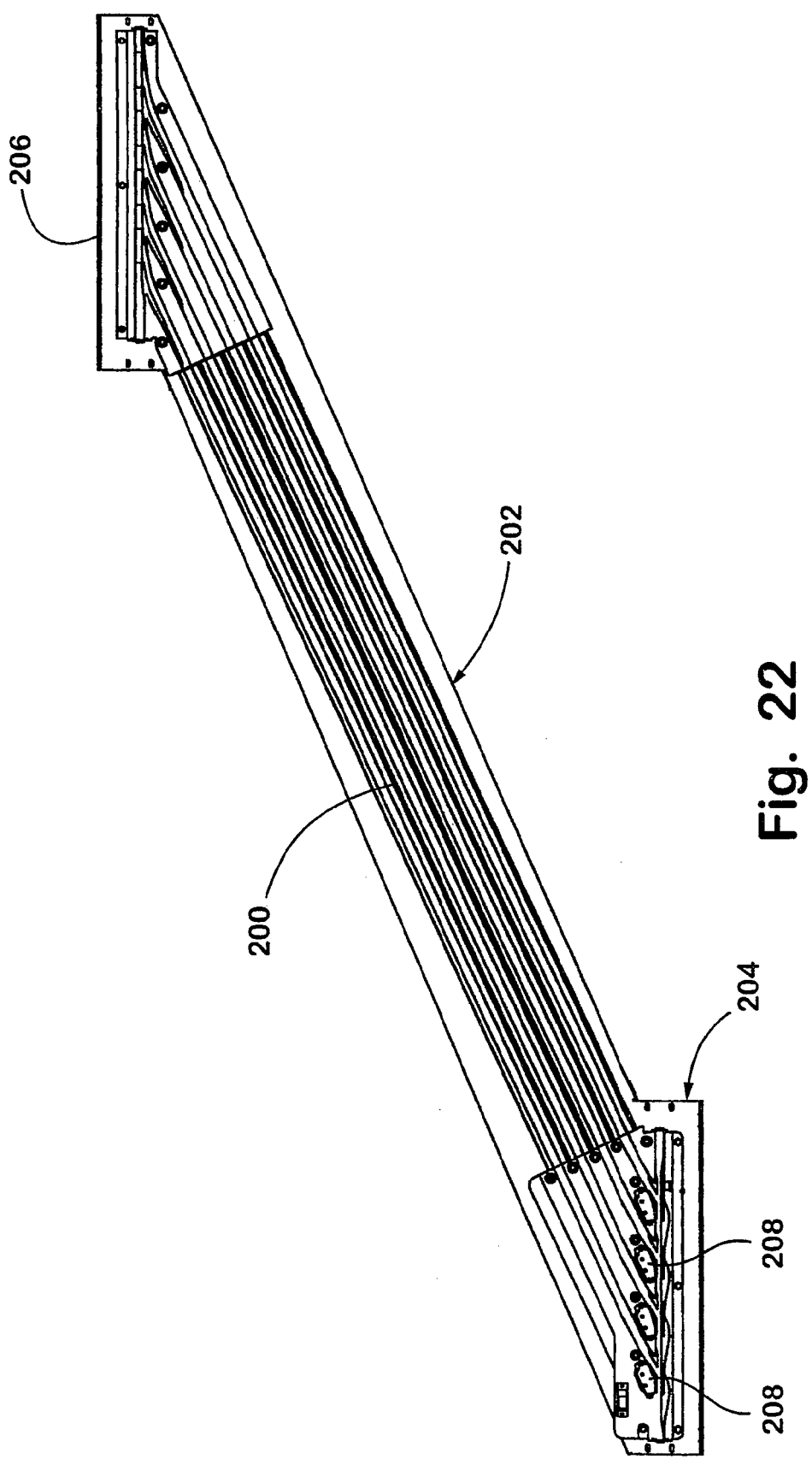
FIG. 22 is a top plan view of a diverting rail assembly.
Figure 23:
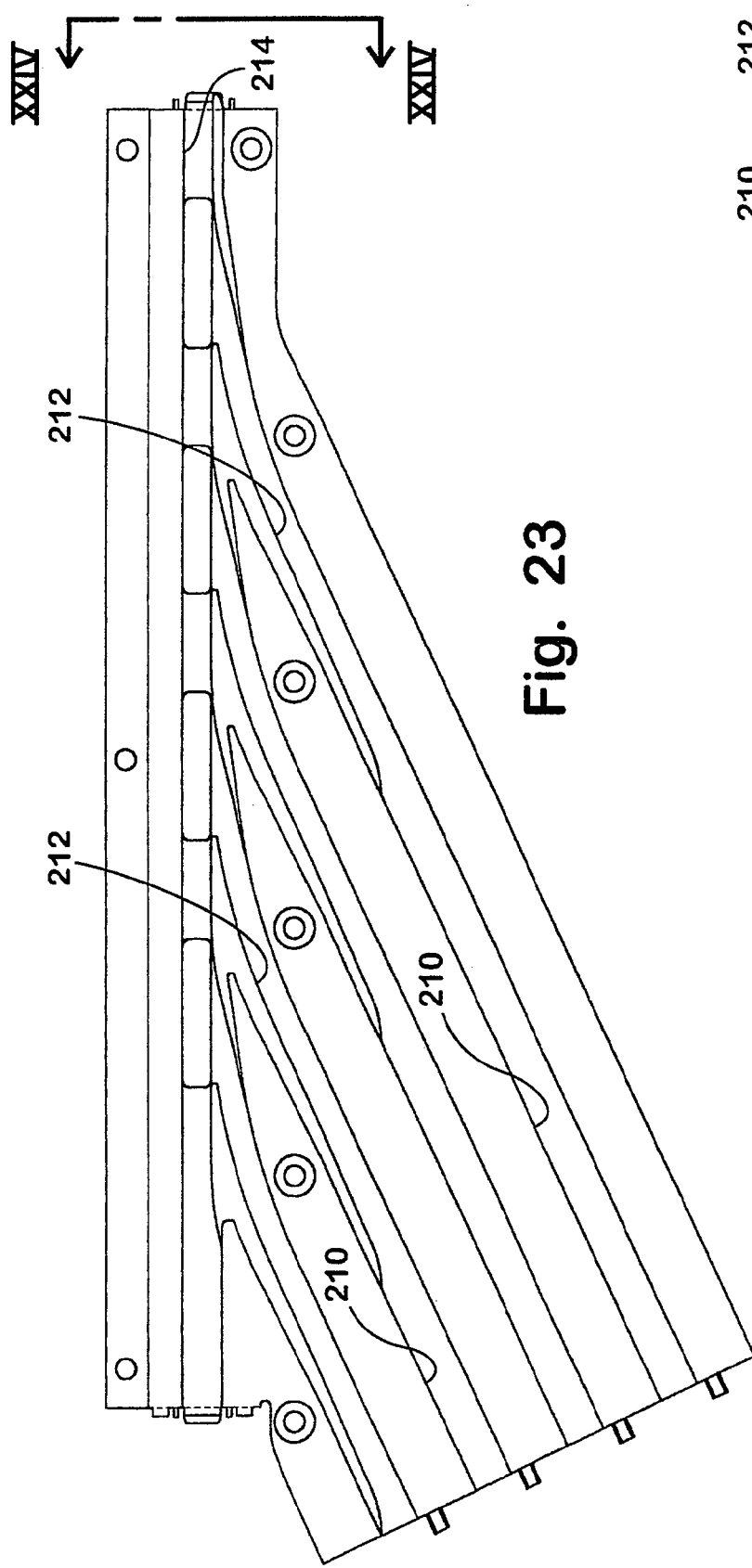
FIG. 23 is a top plan view of a terminal assembly of the diverter rail assembly in FIG. 22.
Figure 24:
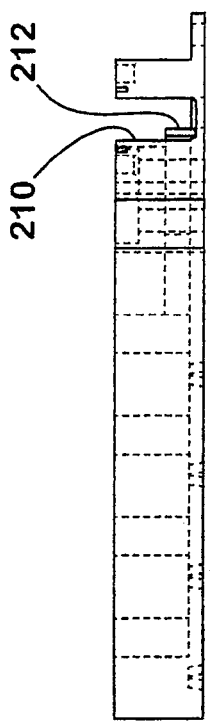
FIG. 24 is an end elevation taken in the direction of lines XXIV-XXIV in FIG. 23.

Referring now specifically to the drawings, and the illustrative embodiments depicted therein, a sorter assembly apparatus 10 is made up of a plurality of slats 20, which are interconnected in an endless web 12 with pusher shoes, or diverter shoes, 126 traveling along some or all of the slats, either on one slat or between two slats, to laterally displace articles on a conveying surface 11 defined by a top run 13 of endless web 12 (FIG. 1). Diverter assemblies 16 laterally displace pusher shoes 126 to divert articles onto selected spurs 216 in order to sort the articles. To do this, diverter assemblies 16 include diverter rails 200 extending diagonally across the conveying surface beneath the web and diverter switches having actuators 208 to divert pusher shoes to individual diverter rails.

Sorter assembly 10 may be of the parallel divert type as disclosed in commonly assigned U.S. Pat. No. 5,165,515; of the diagonal divert type as disclosed in commonly assigned U.S. Pat. No. 5,127,510; or a combination of the parallel and diagonal divert type as disclosed in commonly assigned U.S. Pat. Nos. 6,041,909 and 5,927,465, which are all hereby incorporated herein by reference. To the extent not disclosed herein, sorter assembly 10 may be provided according to the principles set forth in commonly assigned U.S. patent application Ser. No. 09/968,742, filed Sep. 28, 2001, by Veit et al. for a POSITIVE DISPLACEMENT SHOE AND SLAT SORTER APPARATUS AND METHOD, and Ser. No. 09/840,639, filed Apr. 23, 2001, by Veit et al. for a SORTATION SYSTEM DIVERTER SWITCH, and published International Application Nos. WO 01/83342 A1, published Nov. 8, 2001, and WO 02/26602 A2, published Apr. 4, 2002, the disclosures of which are hereby incorporated herein by reference.

The terms "front" and "rear" are relative terms to assist in understanding the disclosed embodiment and should not be considered limiting. References to "upper" and "lower," and the like, with respect to a slat or a pusher shoe are relative to the slat or the shoe in the upper run of the web. The terms "longitudinal" or "longitudinally" refer to direction of movement of the endless web. The terms "lateral" or "laterally" refer to direction from side-to-side of the conveying surface, or perpendicular to direction of movement.

Slats 20 are maintained in their respective position in endless web 12 by a wheel assembly 124. Wheel assembly 124 includes at least one wheel sub-assembly 236 having a wheel 112, which is rotatably mounted about a generally horizontal axis that is at the elevation of, and may pass laterally to, the interior 42 of slat 20. Wheels 112 provide vertical support to web 12. Wheel assembly 124 additionally includes a plate 188 between adjacent slats 20. Plates 188 are affixed with a fastener 89 engaging circular channel 54 in slat 20 and the shaft-supporting wheel 112. In addition, plates 188 join a portion of the adjacent slat such as by a fastener passing through a through-opening 220 of a shaft 218 that rotatably supports wheel 112, thereby joining the adjacent slat and providing pivotal movement between the slats. Slats 20 are coupled to wheel assembly 124 at each end of the slat.

Wheel assembly 124 further includes a wheel subassembly 238 having wheels 122 that provide lateral guidance to web 12. Wheel sub-assembly 238 is fastened to the corresponding slat by fastener 89 passing through an opening 228 in a bracket 224 and engaging circular channel 54. Bracket 224 supports a shaft 222 that rotatably supports wheel 122.

Wheel 112 may be retained on shaft 218, and wheel 122 may be retained on shaft 222 by a deforming of a portion of the respective shaft after the wheel is placed over the respective shaft. The deforming of the shaft may be accomplished by a riveting process such as an orbital riveting process which is a known process. In the case of shaft 218, an outer portion of the shaft surrounding opening 220 is deformed outwardly in order form an enlarged portion 230 to retain the wheel. In the case of shaft 222, the entire outer portion of the shaft is deformed to produce an enlarged portion 232 in order to retain wheel 122. The advantage of this process over known use of C-clips, and the like, is that errors which could occur in assembling the wheel assembly are significantly reduced. If a wheel must be replaced, then the wheel sub-assembly 236, 238 including the wheel and shaft may be replaced. Advantageously, shaft 222 may be attached to bracket 224 by a similar deforming process in order to form an enlarged portion 234. Therefore, the wheel 122 may be attached to shaft 222 and shaft 222 to bracket 224 in a single series of similar operations with limited manual assembly, if at all. The result is a wheel subassembly 236 and a wheel subassembly 238 which may be supplied to the assembly operation, or a repair facility, and may be readily attached as part of the endless web and may be stocked as a replacement part.

The propulsion system is defined by one or more linear motor primaries 28 and linear motor secondaries. The secondaries include magnet plates 64 retained within the interior of at least some of the slats 20. The propulsion system is used to propel endless web 12. A magnet plate 64 may be included within each slat 20 or fewer than all of the slats. Magnet plates 64 may be retained within the associated slat 20 by a retainer 69 (FIGS. 4 and 5). Retainer 69 is an elastic spring member which biases the associated magnet plate against a wall of the slat. The retainer acts against flanges 165, 166 defined within the interior of the slat 20. In the illustrated embodiment, the retainer is made from aluminum and the magnet plates are made from steel. However, other materials may be used for the retainer, such as plastic, steel, copper, or the like. Retainer 69 is urged into a generally arcuate shape in the slat and is elastic in order to maintain a bias against the magnet plate.

As best seen in FIG. 5, the magnet plates 64 have a width $W_p$ that is less than half of the $W_s$ of the corresponding slat 20. It can also be seen in FIG. 5 that the width $W_r$ of retainer 69 is substantially the same as the width of the corresponding magnetic plate 64. This provides for effective retention of the magnet plate within the interior of the corresponding slat 20. It can be further seen from FIG. 4 that the length of the retainer 69 in the longitudinal direction of movement of endless web 12 is greater than half the length of the magnet plate 64. This, again, provides for effective retention of the magnet plate within the corresponding slat 20. The retainer may be provided as an integral member or as a series of separate retainer portions, provided that they provide sufficient retention force to keep magnetic plate 64 positioned.

Pusher shoe 126 may be a wraparound shoe, generally of the type disclosed in commonly assigned U.S. Pat. No. 5,127,510 and co-pending application Ser. No. 09/968,742, filed Sep. 28, 2001, by Veit et al. for a POSITIVE DISPLACEMENT SHOE AND SLAT SORTER APPARATUS AND METHOD, and International Publication No. WO 02/26602 A2, published Apr. 4, 2002, the disclosures of which are hereby incorporated herein by reference. Alternatively, a pusher shoe may be used that is supported by and moves along facing end portions of adjacent slats. Shoe 126 may be molded from a plastic material that is made of a series of wall segments having a substantially uniform thickness as disclosed in the commonly assigned '510 patent. Pusher shoe 126 may be a one-piece shoe. It could also have separate support portions that move along the respective slat and diverter portions and diverter portions, or assemblies, that laterally displace product on the conveying surface, as disclosed in the '510 patent.

Pusher shoe 126 has a base 45 made up of a polymeric material, which is selected for its relatively low cost and high strength. Base 45 includes inward projections 180, 182 and 184, which provide slat engagement portions which engage corresponding portions of the slats. By way of example, inward projection 184 cooperates with its corresponding shoe-engaging portion of the slat to form a lateral stabilizer for resisting rotation about a vertical axis. Inward projections 180, 182 resist rotation about the long axis of the slat as well as support the weight of the shoe. Inward projections 180, 182 and 184 in the illustrative embodiment are covered with a second polymeric material that is self-lubricating. Inward projections 180, 182 and 184 may be covered with strips that fit over inward projections on base 45. Alternatively, inward projections 180, 182 and 184 may be made in their entirety of self-lubricating material and supported by base 45 in another manner that would be apparent to one of ordinary skill in the art, such as by fasteners, or the like.

Pusher shoe 126 additionally includes a diverting assembly 137. Diverting assembly 137 may be integrally formed with base 45 or, as illustrated herein, may be coupled with base 45, such as by snap engagement with the base, or the like. Diverting assembly 137 includes an article-contacting member 47 that is flexible, and may also be resilient, thereby cushioning the impact with articles being diverted. In order to enhance such cushioning function, article-contacting member 47 may include voids 49 which enhance the flexibility of the article-contacting member. Additionally, article-contacting member 47 may have a convex surface that may be of generally arcuate shape.

Sorter 10 is capable of operating at high speeds. By way of example, sorter 10 may be capable of sorting 300 or more industry standard packages per minute. At such speeds, the impact of pusher shoe 126 against an article is softened by the cushioning of article-contacting member 47. The arcuate shape of article-contacting member 47 ensures that there will be more than a single-point contact with the article being diverted.

Diverting assembly 137 includes extensions 51, which fit within openings 53 of base 45. Extensions 51 include resilient tabs 55, which engage openings 57 in base 45 in order to retain the diverting assembly to the base. A tool, such as a screwdriver, may be inserted in openings 57 to release the extensions from the openings 53.

The configuration of base 45 and diverting assembly 137 also allows the diverting assembly to be positioned on either lateral side of base 45. This allows the pusher shoe 126 to be used as either a right-hand divert, a left-hand divert, or, with two diverting assemblies, a bilateral divert. Diverting assembly 137 further includes wings 59 that cooperate with sloping surfaces 61 of base 45 in order to reduce jams between stationary packages. Wings 59 also include sloped surface 63 at an angle $\alpha$ from vertical in order to further help in deflecting jammed packages. Article-contacting member 47 is made from a polymeric material that imparts the flexible and resilient properties thereof and may snap-fit to a support 71, such as by flexible flanges 73 engaging openings 75 in support 71.

Pusher shoe 126 may include a transfer assembly 130 extending downwardly from the pusher shoe. To the extent not disclosed herein, transfer assembly 131 may be of the type disclosed in commonly assigned U.S. patent application Ser. No. 09/840,639, filed Apr. 23, 2001, by Veit et al. for a SORTATION SYSTEM DIVERTER SWITCH, and International Publication No. WO 01/83342 A1, published Nov. 8, 2001, the disclosures of which are hereby incorporated herein by reference. Transfer assembly 130 may be an elongated member utilized to divert the pusher shoe to a guide rail and to guide the pusher shoe along a guide rail of a diverter assembly 16 in order to divert packages. The transfer assembly includes a pilot, or guide, or lead low-friction member, such as a roller or bushing 132, an intermediate low-friction member, such as one or more rollers or bushings 140, and a trailing low-friction member, such as a roller or bushing 138. Low-friction members 132, 140 and 138 are supported by a toggle 134. Transfer assembly 130 further includes a rotary coupling 136 rotatably supporting toggle 134 to base 45. Rotary coupling 136 includes a pin 79 joined with base 45, such as by insert-molding, or the like. Pin 79 includes a pair of hex flanges 81 to make a strong connection with base 45 and lip 83. Pin 79 is treated by known techniques in order to make it more stress-resistant. Rotary coupling 136 may further be defined by lips 83. Lips 83 extend in opposite directions below flange 81 engaging fingers 85 of toggle 134 in order to retain the toggle to the base 45 while allowing limited rotary motion between the toggle and the base. Other means, not shown, restrain toggle 134 to a relatively limited range of motion in order to prevent fingers 85 from rotating out of engagement with lips 83. The means to limit rotary motion may be engaged after the toggle is assembled to the pin in order to allow assembly of the rotary coupling.

A shaft 143 rotatably supports pilot member 132 and extends downwardly from toggle 134 in a direction opposite base 45. Pin 79 also extends below toggle 134 in a direction opposite base 45. Shaft 143 and pin 79 frame a vane 142. As described in published International Application WO 01/83342 A1 published Nov. 8, 2001, a vane may serve the purpose of spanning portions of the diverter track during diverting in order to ensure that, once a divert is initiated, it is completed. Shaft 143 may be made from a magnetic material, such as steel, and may be attracted with a relatively weak force to a magnet (not shown), such as a permanent magnet, positioned within a diverting rail assembly 202. The purpose of this arrangement is in order to maintain transfer assembly 130 in a non-diverting orientation when it is not intended to be diverted in order to avoid mis-diverts, as disclosed in International Publication No. WO 01/83342 A1. Additionally, shaft 143 and pin 79 impart mechanical strength to the transfer assembly by surrounding vane 142, which may be made from a polymeric material and may be commonly molded with toggle 134. Toggle 134 may include voids 86 in order to reduce weight and material cost.

Shaft 143 and a shaft 150 supporting trailing low-friction member 138 may be retained and positioned by a clasp 152. This provides simplified snap-action mechanical assembly of transfer assembly 130. In the illustrative embodiment, guide bushing 132 is made from a magnetic material in order to be attracted by an electromagnet actuator 208 in order to initiate the divert. Guide bushing 132 may be a unitary or a two-part bushing. An inside bushing may be made out of plastic and rotate on shaft 143. A bearing casing that is made from a magnetically permeable material, such as steel, may be provided external to the inside bushing. Trailing roller 138 may be made from a non-magnetic material, such as plastic, in order to avoid reacting with an actuator of a diverting assembly attempting to divert a trailing pusher shoe. Intermediate low-friction member 140 may be one or, as illustrated, a pair of steel bearings in order to carry the load of the divert of pusher shoe 126 while diverting an article. Intermediate low-friction member 140 would carry the load by interacting with a diverting rail 200.

Diverting rail assembly 202 includes one or more diverting rails 200 which extend between a diverter assembly 204 and a terminal portion 206. Diverter rail assembly 204 may be as disclosed in U.S. patent application Ser. No. 10/248,235, filed Dec. 30, 2002, by Cochran et al., for a SORTATION SYSTEM MAGNETIC DIVERTER and in International Publication No. WO 01/83342 A1, published Nov. 8, 2001, the disclosures of which are hereby incorporated herein by reference. Because the details of diverter assembly 204 are disclosed in such application and publication, they will not be repeated herein. Suffice it to say, diverter assembly 204 includes one or more actuators 208 which divert a transfer assembly 130 onto a diverting rail 200 where the forward motion of endless web 12 causes the corresponding pusher shoe to travel across the conveying surface. Diverting rail 200 may be generally straight or may be multiple portions at different angles with respect to the longitudinal direction of the sorter assembly, as disclosed in commonly assigned patent application Ser. No. 10/284,591, filed on Oct. 31, 2002, by Veit for a CONVEYOR SYSTEM WITH DIVERTING TRACK NETWORK, the disclosure of which is hereby incorporated herein by reference.

At the end of the divert, a terminal portion 206 of divert rail assembly 202 converts the diagonal motion of the pusher shoe to a longitudinal motion in the direction of the web. Terminal assembly 206 is configured in order to direct the transfer assembly to the longitudinal direction in a continuous motion thereby reducing audible noise produced with conventional diverting rails when the bearing below the pusher shoe strikes the side rail of the sorter. Because the change in direction is generally continuous, terminal portion 206 avoids the abrupt change in direction of the pusher shoe and the collision with the side rail which is characteristic of the prior art.

Terminal portion 206 includes an upper surface 210 which is engaged by rotary coupling 136 as well as pilot member 132 and trailing low friction member 138. Terminal portion 206 additionally includes a lower surface 212 which engages vane 142. Lower surface 212 is curved in a manner which terminates tangentially with a longitudinal channel 214 extending parallel with the side of the frame 18. This configuration allows the vane 142 to guide the transfer of motion from diagonally to longitudinal in a generally smooth continuous motion while providing space for rotary coupling 136, whether being diverted or traveling straight through the terminal portion. This is accomplished while accommodating the tight space constraints of a parallel, or initially parallel, diverter in which multiple diverting rails are utilized for each take-away conveyor 216, and the diverters and diverting rails are spaced apart no more than the spacing, or pitch, of the pusher shoes. Although illustrated for use with a vane 142, it should be understood that lower surface 212 may also be used to guide a pin extending below a bearing and upper surface 210 used to guide a bearing, such as disclosed in commonly assigned U.S. Pat. No. 5,127,510, the disclosure of which is hereby incorporated herein by reference.

Figure 30:
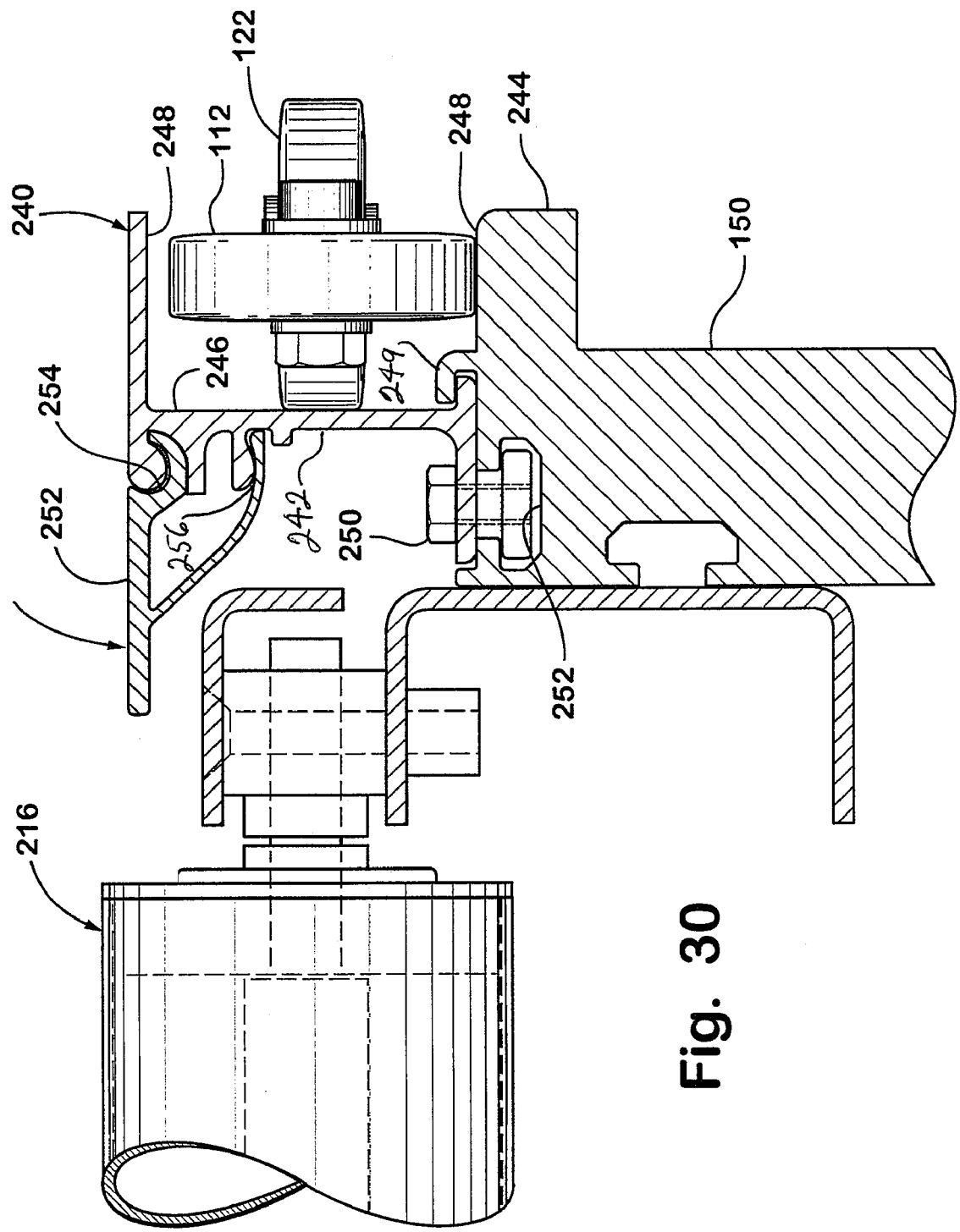
FIG. 30 is a sectional view taken along the lines XXX-XXX in FIG. 20.
Figure 31:
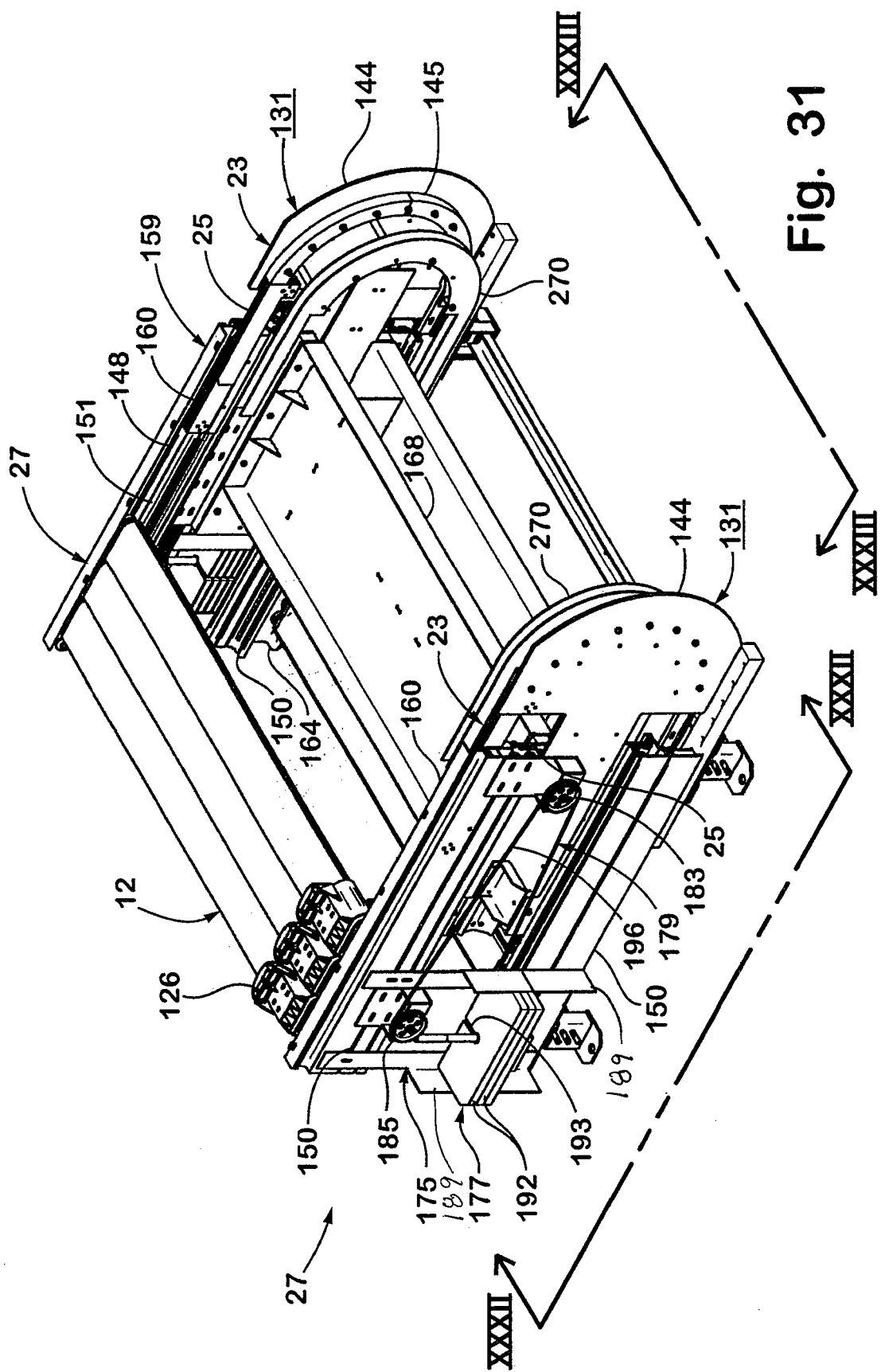
FIG. 31 is a perspective view of a take-up end of a frame assembly.

Sorter assembly 10 may include an upper portion 240 of the horizontal members 150 of the frame assembly (FIG. 30). Upper portion 240 includes an upper extruded section 242 which is joined with a lower extruded section 244. Extruded sections 242 and 244 define a vertical surface 246 for resisting lateral motion of web 12 and at least one horizontal surface 248 for providing support of the weight of the web. Extruded section 242 may be engaged with lower extruded section 244 by a fastener 250 engaging a T-slot 252 in the lower extruded section 244 and passing through an opening in the upper extruded section 242. A pair of overlapping flanges 249 may support an extruded section in a manner that supports vertical surface 246 against the force exerted by wheels 122. Upper portion 240 may additionally include a cover, such as a dust cover 252, which provides an outward extension, in the direction of take-away conveyor 216, of extruded section 242. The purpose of dust cover 252 is to reduce the gap between the upper extruded section 242 and the take-away conveyor 216. This reduces a tendency of packages to jam while being diverted. Dust cover 252 may be attached to extruded section 242 by a general rotary motion as illustrated in FIG. 30. This is accomplished by a rotary joint 254 defined between the dust cover and the extruded section as well as a snap joint 256 defined between the dust cover and the extruded section. Therefore, by engaging the respective portions of the rotary joint, and rotating dust cover 252 downwardly, the snap joint 256 is engaged. The rotary joint and the snap joint securely retain dust cover 252 in its operative position.

A frame 148 of sortation conveyor 10 includes at least two elongated horizontal members 150, 150 (FIGS. 31-39). Frame 148 includes a first moveable member 23 and force-producing device 27 which define a first adjustable take-up assembly 131 for maintaining tension at one lateral side of endless web 12 and another moveable member 23 and force-producing device 27 which define a second adjustable take-up assembly 131 for maintaining tension at the opposite lateral side of endless web 12. The first and second adjustable take-up assemblies operate substantially independently of each other. This provides a separate take-up function on opposite lateral sides of web 12. This provides a more consistent tension on the web laterally across the web. While, in the illustrative embodiment, there is no interconnection between the take-up assemblies, some interconnection can be accommodated without negating the independent operation of the take-up assemblies.

Each take-up assembly 131 provides a substantially constant force upon one end of web 12 to thereby maintain the same in the proper state of tension, and takes up any slack existing between slats 20. Each take-up assembly 131 may be comprised of two identical sets of components, each of which is attached to a pair of horizontal members 150 at one side of frame 148. Therefore, the subsequent description will detail only one set of components, with the understanding that the identical components may be placed on the opposing side of sortation apparatus.

Take-up assembly 131 includes an end track, or transitional rail assembly, 144 which is supported to extend or retract with respect to horizontal members 150, in the same general manner as disclosed in International Publication No. WO 02/26602 A2, published Apr. 4, 2002.

An expansion joint assembly 25 is provided to enable end track 144 to move in a horizontal direction either towards or away from an upper track 160 and a lower track 164 while maintaining continuity of the track. Joint assembly in the illustrative embodiment is a finger joint having first and second interlaced finger assemblies.

To provide the necessary force upon end tracks 144 of take-up assembly 131, force-producing device 27 in the form of an adjustable force assembly 175 is provided which imparts a constant force upon end tracks 144 to thereby maintain the same in the proper position and thereby take up slack within endless web 12. Adjustable force assembly 175 may include an adjustable weight system 177, and a pulley system 179. Pulley system 179 includes a first pulley 183 and a second pulley 185.

Weight assembly 177 includes a pair of spaced, vertically oriented L-shaped alignment members 189. The weight assembly may be adjustable by adding or subtracting weight. Positioned between alignment members 189 are a plurality of removable weights 192, each of which includes a keyhole-shaped slot 193 for accommodating a cable 196.

A connection member, such as, for example, cable 196, is attached to weight-retaining member 193 and trained about first pulley 183 and second pulley 185. Cable 196 is attached at one end to transitional rail assembly 144 and an opposite end to weight assembly 177.

A frame assembly 148 includes elongated horizontal members 150 which define fastener channels 151 in order to facilitate modular construction of the sorter assembly as disclosed in commonly assigned International Publication No. WO 02/26602 A2, published Apr. 4, 2002, the disclosure of which is hereby incorporated herein by reference. A support track network, generally shown at 159, provides a pathway for wheel assembly 124 to travel in upper and lower runs along frame 148. Support track network 159 includes a track 161 at one side of the sorter apparatus and another track 161 at the opposite side of the sorter apparatus. Each track 161 includes an upper track 160, in order to support the upper run of the web, a lower track 164 in order to support the lower web, and end tracks 144 in order to support transitional sections of the web between the upper and lower runs.

Figure 25:
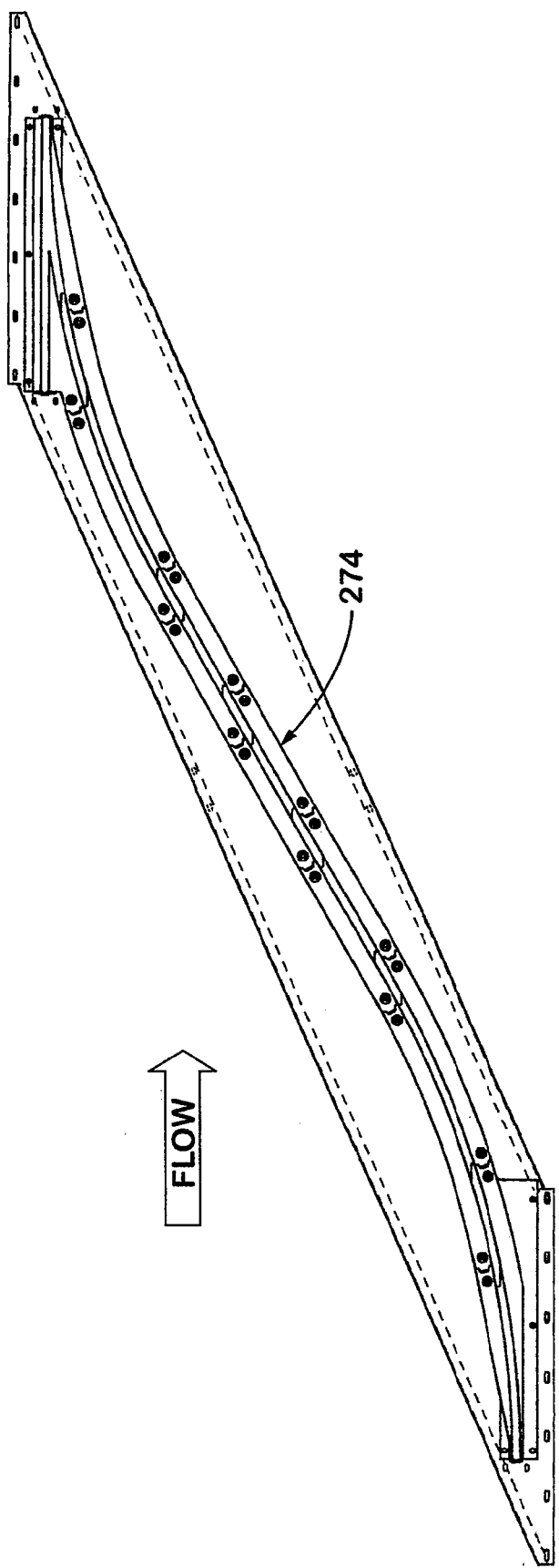
FIG. 25 is a top plan view of a diverter shoe return rail assembly.
Figure 34:
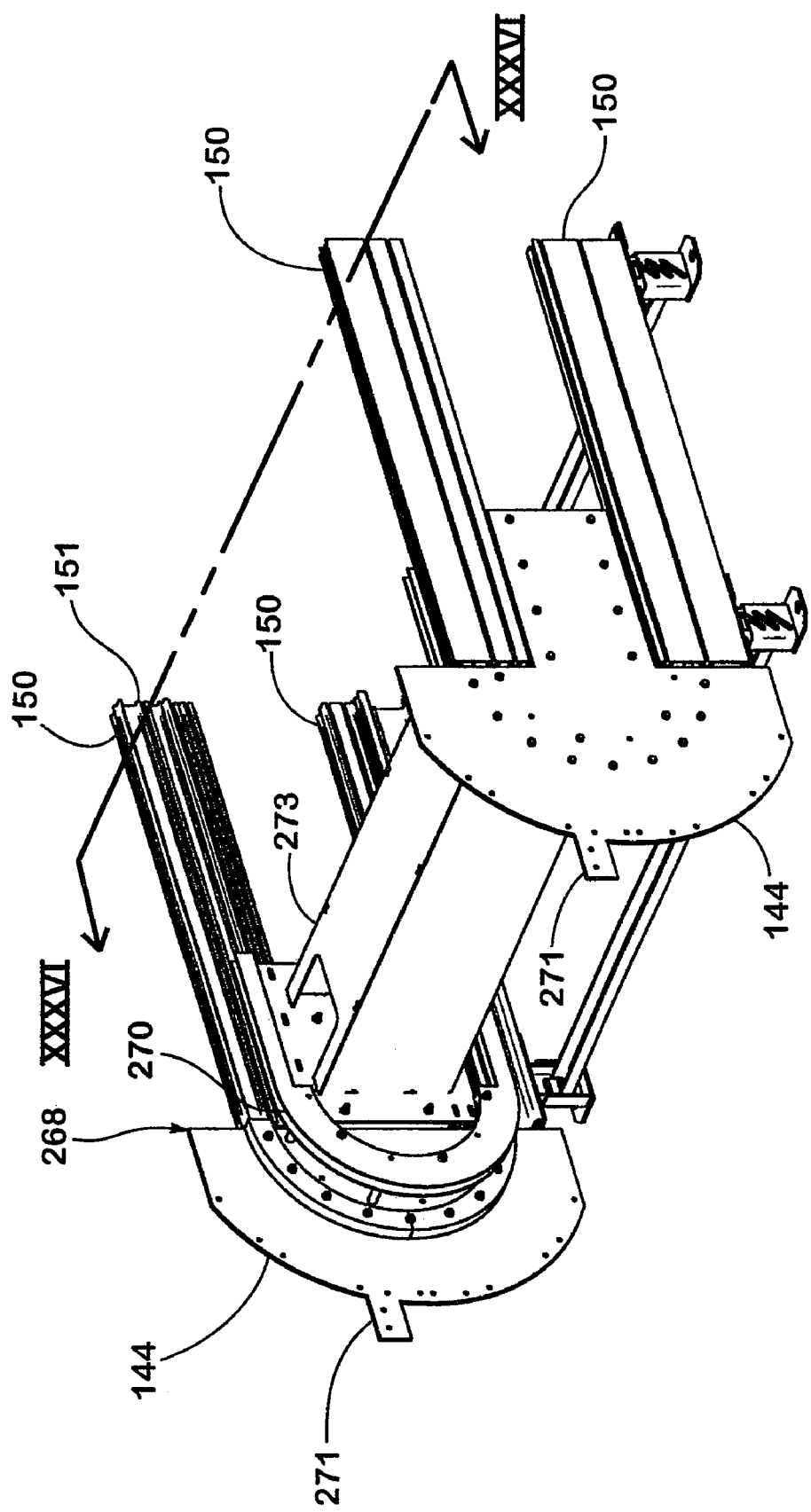
FIG. 34 is a perspective view of a stationary end of a frame assembly.

End track 144 is included as a portion of take-up assembly 131 and is included on a stationary end assembly 268 at an opposite end of the apparatus (FIG. 34). Stationary end assembly 268 may include a cross-support 273 and a pair of mounting flanges 271 which may provide alignment for a feed, or take-away, conveyor, as will be discussed in more detail below. Take-up assembly 131 and end section 268 additionally includes a guide track 270 at an area generally adjacent end track 144. Guide track 270 is made up of a pair of spaced-apart walls 272 which define therebetween a channel for maintaining an in-line orientation of toggle 134 of transfer assembly 130 for each pusher shoe as the pusher shoe goes through the transition between the upper and lower runs of web 12. Alternatively, one wall 272 may be used. In turn, guide track 270 is fed in part by a return rail assembly 274 (FIG. 25) which returns diverted pusher shoes to an undiverted position while traveling in the lower run of the web. Return sweep 274 has a large radius curved shape at both entrance and exits thereof to reduce noise of the return pusher shoes. Shoes that were not diverted continue in their undiverted orientation until the transfer assembly 130 is guided by guide track 270. Although return rail assembly 274 is illustrated for a unidirectional divert in which packages are diverted to take-aways at one side of the sorter assembly, as illustrated in FIG. 20, it should be understood that one or more appropriately modified return rail assemblies would be utilized for a bi-directional divert in which packages are diverted off both sides of the conveying surface.

Figure 37:
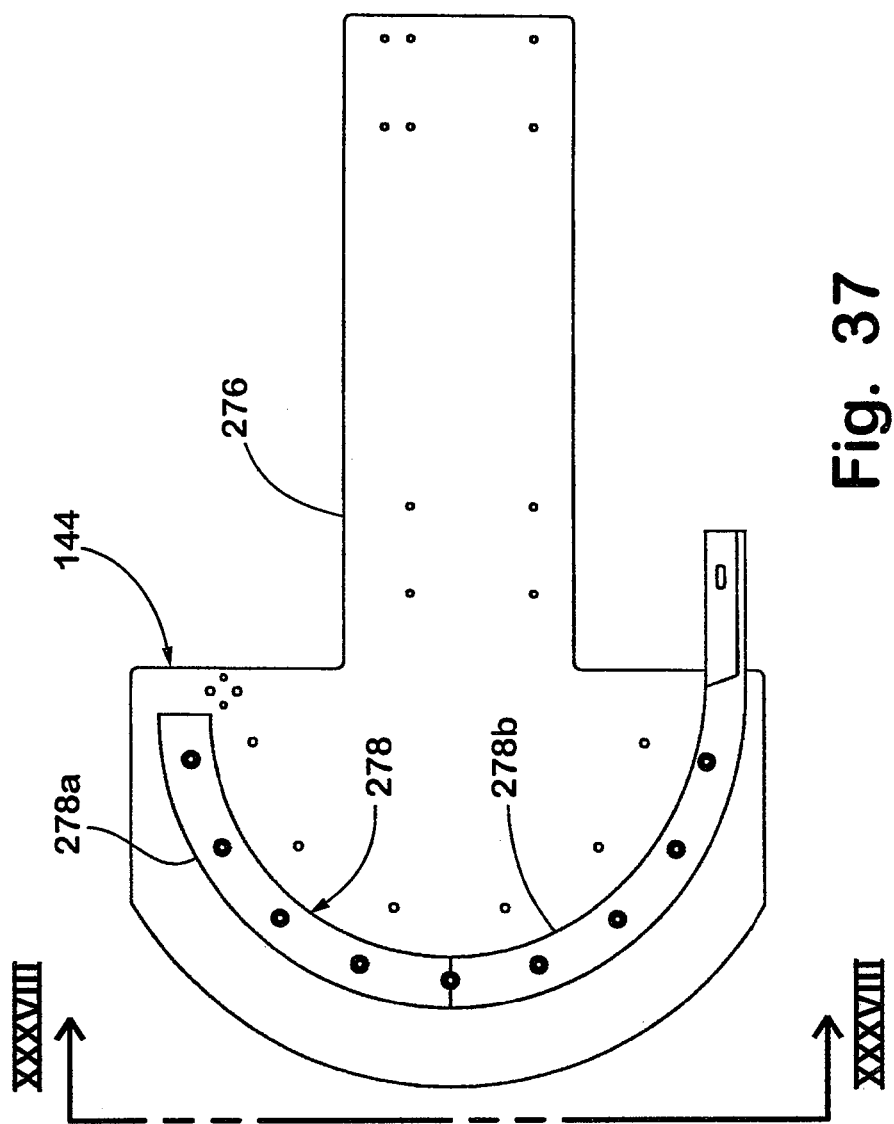
FIG. 37 is a side elevation of a transitional rail assembly.
Figure 38:
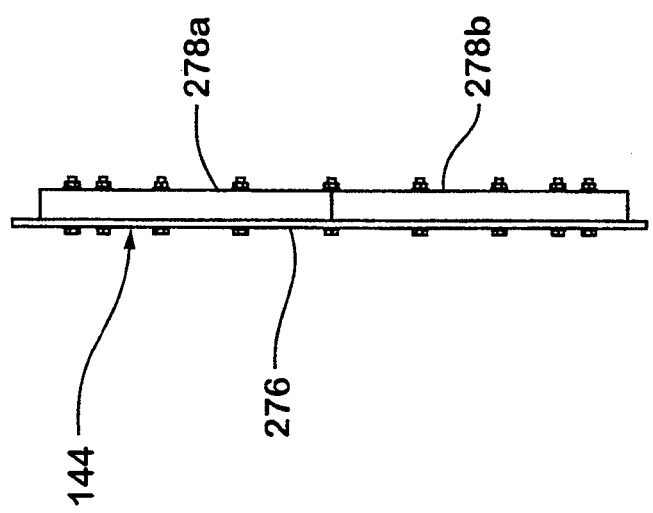
FIG. 38 is an end elevation taken in the direction of lines XXXVIII-XXXVIII in FIG. 37.
Figure 39:
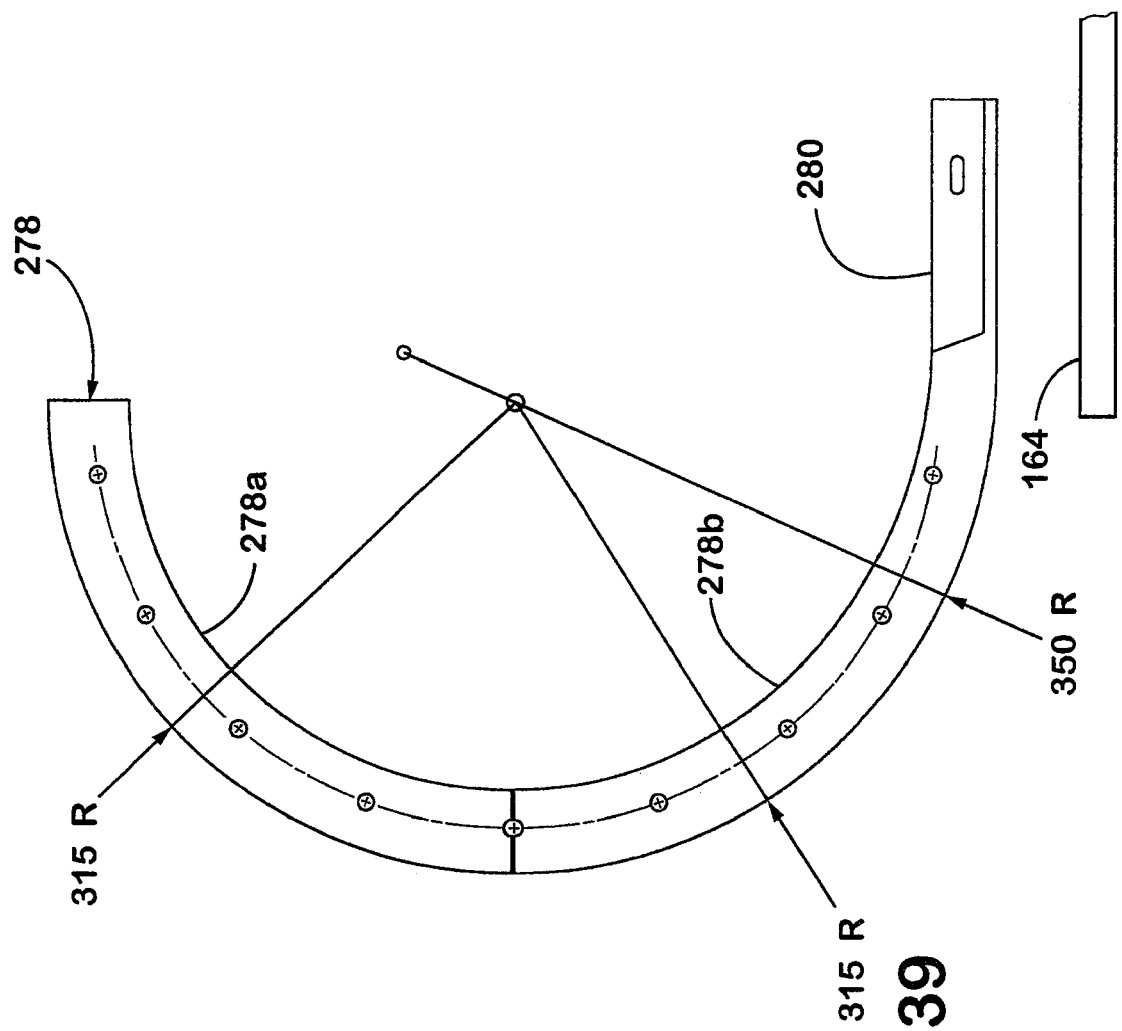
FIG. 39 is the same view as FIG. 37 of the rail portion of the assembly.
Figure 40:
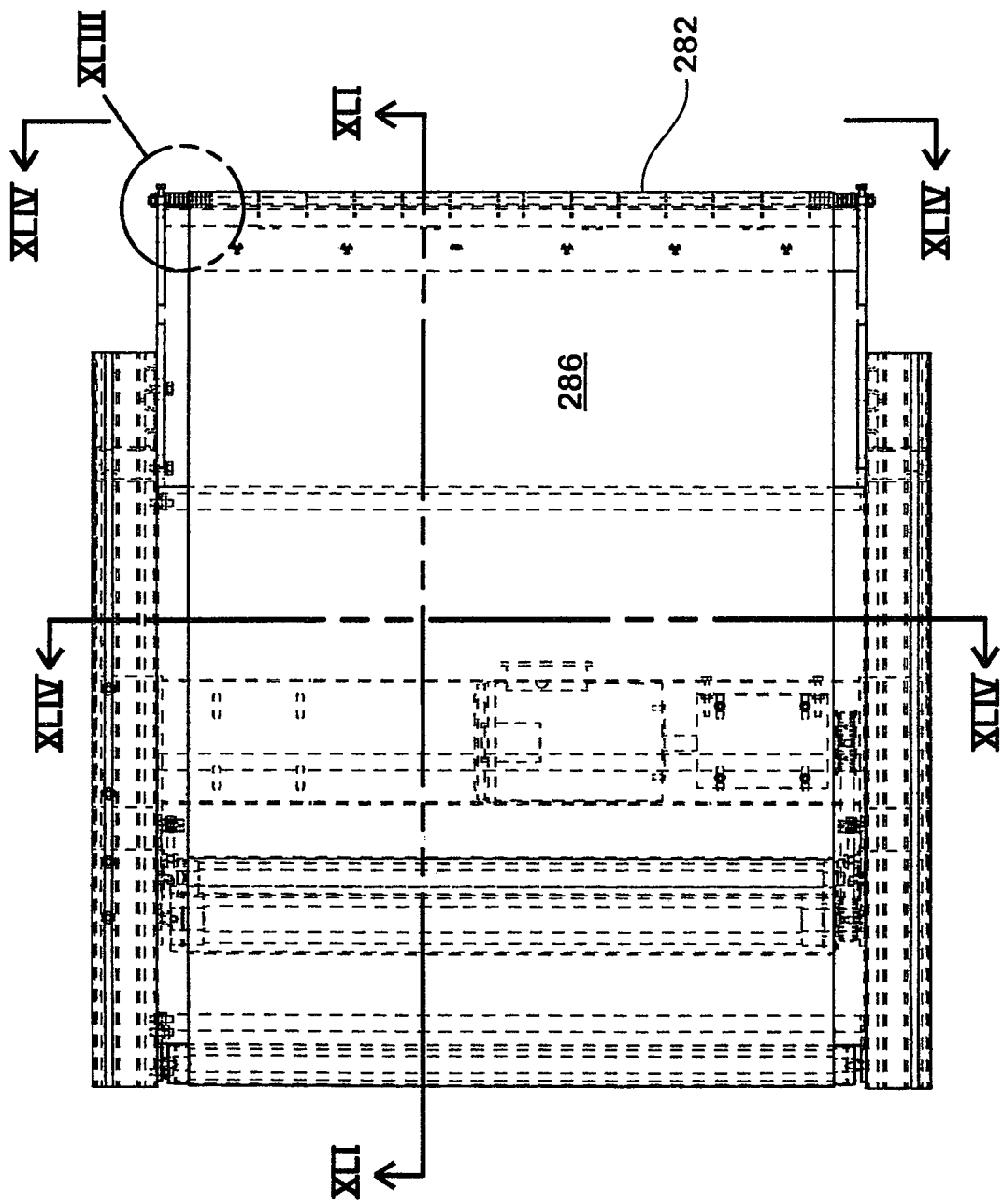
FIG. 40 is a top plan view of a feed conveyor.
Figure 45:
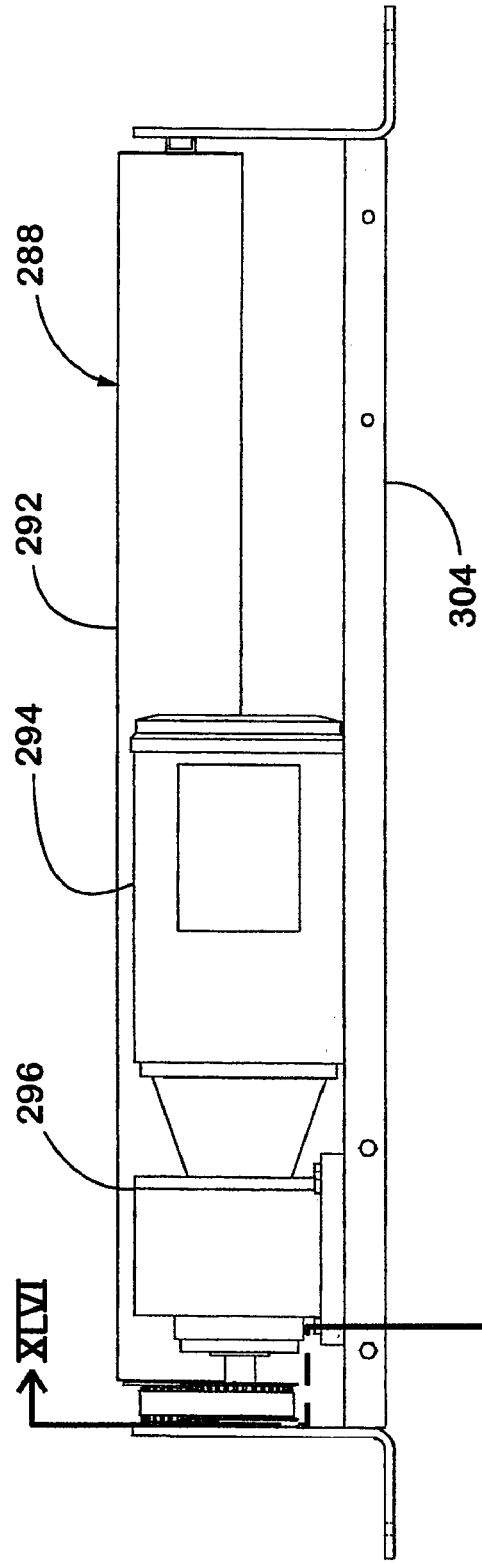
FIG. 45 is an end elevation of a drive assembly.
Figure 46:
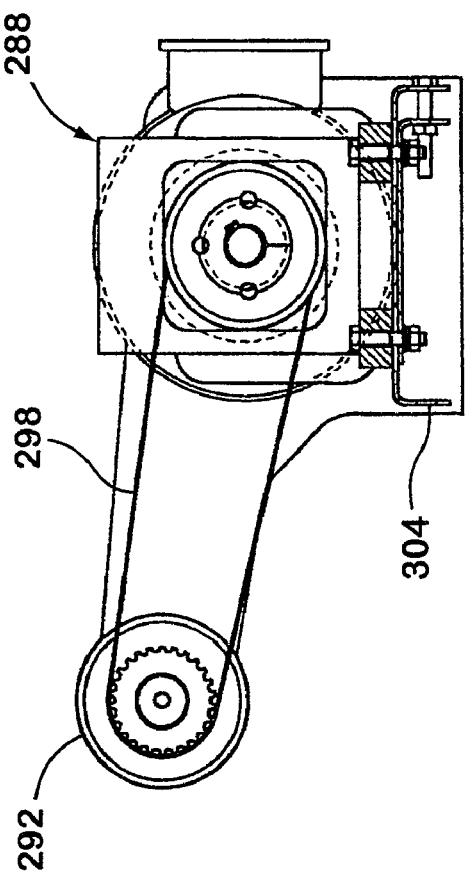
FIG. 46 is a view taken along the lines XLVI-XLVI in FIG. 45.

End track 144 includes a support 276 and a rail 278 (FIGS. 37-39). Rail 278 includes an upper portion 278A and a lower portion 278B. End track 144 may be a part of the take-up assembly 131, and therefore be movable in order to take up slack in the web and maintain consistent tension on the web, or may be stationary at stationary end assembly 268. In one or more of such applications, rail 278 includes an upper portion 278A having a generally constant radii and a lower portion 278B having radii that are different for different locations around the rail. By way of example, in FIG. 39, it can be seen that on rail 278A a generally constant radius of 315 millimeters is utilized. On rail portion 278B the radius increases from 315 millimeters at an upper portion of the rail portion to 350 millimeters at a lower portion of the rail portion. Rail portion 278B may also include an extension 280 that extends beyond the general semi-circular shape of the rail and extends over a portion of lower track 164. It has been found that the use of an increasing radius lower in the rail reduces slap of the slats against the end track both at the end where the slat movement is downward and the end where the slat movement is upward. The radius increases towards the lower portion of the sorter apparatus at both the moveable and fixed ends of the sorter assembly. It has further been found that extension 280, which extends the end track to be overlaying a portion of lower track 164, further reduces audible noise. While one configuration of an end track having a series of unequal radii is illustrated herein, other examples may suggest themselves to the skilled artisan as set forth in International Publication WO 02/26602 A2, the disclosure of which is hereby incorporated herein by reference.

Sorter assembly 10 may additionally include a feed conveyor 282 (FIGS. 40-46). Feed conveyor 282 includes a frame 284, an endless conveyor belt 286 and a drive assembly 288 for driving conveyor belt 286. In a drive position illustrated in FIG. 41, the drive assembly is affixed to frame 284 in a manner that the belt is in tension around a take-up assembly 290. In such position, belt 286 is reeved approximately 180 degrees around drive roller 292 of drive assembly 288 in order to provide good frictional contact between the drive roller and the belt.

Drive roller 292 is driven by an electric motor 294 and a gear reducer 296 through a transmission device such as a cog belt 298. Frame 280 includes an upper belt support plate 300, a pair of side channels 302, and a cross-brace 304. In the illustrative embodiment, cross-brace 304 is also a part of the drive assembly 288. Feed conveyor 282 will be supported in a conventional manner, such as suspended by the ceiling or supported by legs (not shown). Additionally, side channels 302 may be connected with horizontal members 150 through connection with support flanges 271 in order to maintain a consistent relationship between the feed conveyor and the conveying surface 11. Belt 286 is reeved at the rear of belt support plate 300 by a idler roller 306 and in the front by a series of bearings 308 which are supported by a shaft 310. In the illustrative embodiment, shaft 310 is distorted in a bowed fashion in a way that the bearings 308 are more forward the closer to the centerline of the feed conveyor. This simulates a crowned pulley and therefore provides tracking to keep belt 286 centered on the belt support plate.

In order to change the belt 286, drive assembly 288 may be displaced from its operating position, such as by the removal of several bolts holding cross-brace 304 to side channels 302. With the drive assembly removed in this fashion, belt 286 is sufficiently slack to allow it to be slid over side channels 302. Thus, with the supports (not shown) for the feed conveyor disconnected at one lateral side thereof and the drive assembly 280 moved from the operative position, the belt may be easily removed and replaced. While this feature is especially useful for sortation systems, which are at a central flow point in the system and therefore cannot be conveniently down for maintenance for extended periods of time, the unique features of feed conveyor 282 may have applications in other locations of the conveyor system. Although drive assembly 288 is illustrated as being removable by removing the cross-brace, other techniques would suggest themselves for moving the drive assembly out of the operative position, such as hinges and other fastener arrangements. Also, although the invention is illustrated with a single belt, it could also be utilized with a series of narrow strip belts.

Figure 50:
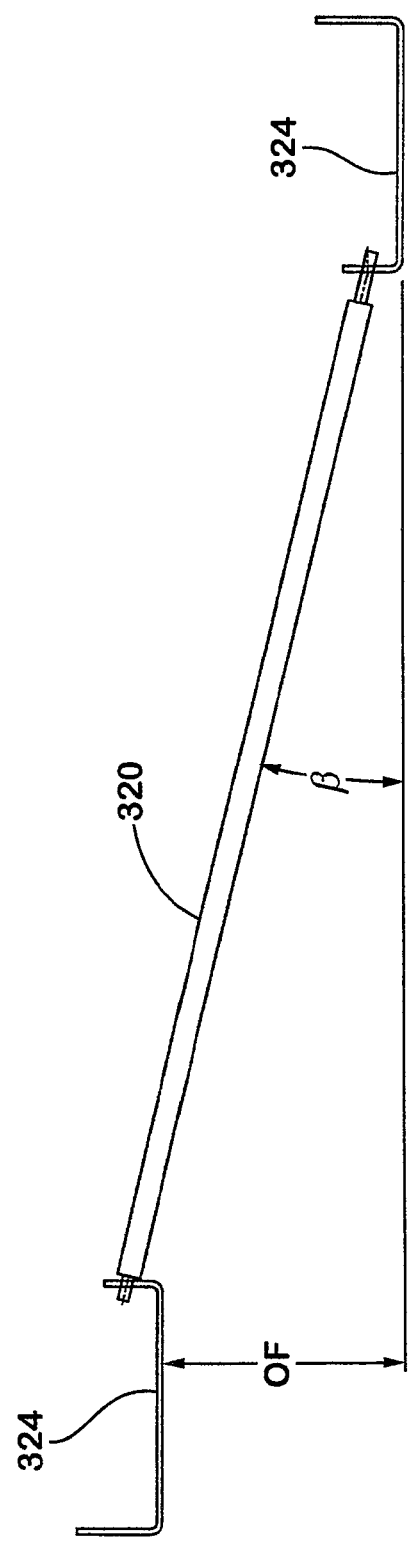
FIG. 50 is the same view as FIG. 48 illustrating adjustability of the take-away conveyor.

Sortation system 10 may also include a product-handling conveyor 312. Product handling convey 312, in the illustrative embodiment, is for removing product from the conveying surface that has not been diverted to one of the take-away conveyors 216. Product handling conveyor 312 includes a flexible body 314 defining a conveying surface such as by a series of conveyor rollers 316. Flexible body 314 includes an inner end 318 that is moveable with take-up assemblies 131. As previously set forth, take-up assemblies 131 are independently operable in order to maintain a particular tension of the endless web 12. Because the take-ups are independent of each other, it is possible for one take-up to be at a more extended position than the other take-up assembly (FIG. 50). Moreover, both of the take-up assemblies are capable of moving within a range of extended positions. Accordingly, as the take-up assemblies move throughout their ranges of adjustment, the ability of inner end 318 to move with the take-up assemblies and the flexible body 314 of the product handling conveyor accommodates this offset movement while continuing to remove product off the conveying surface 11.

Figure 47:
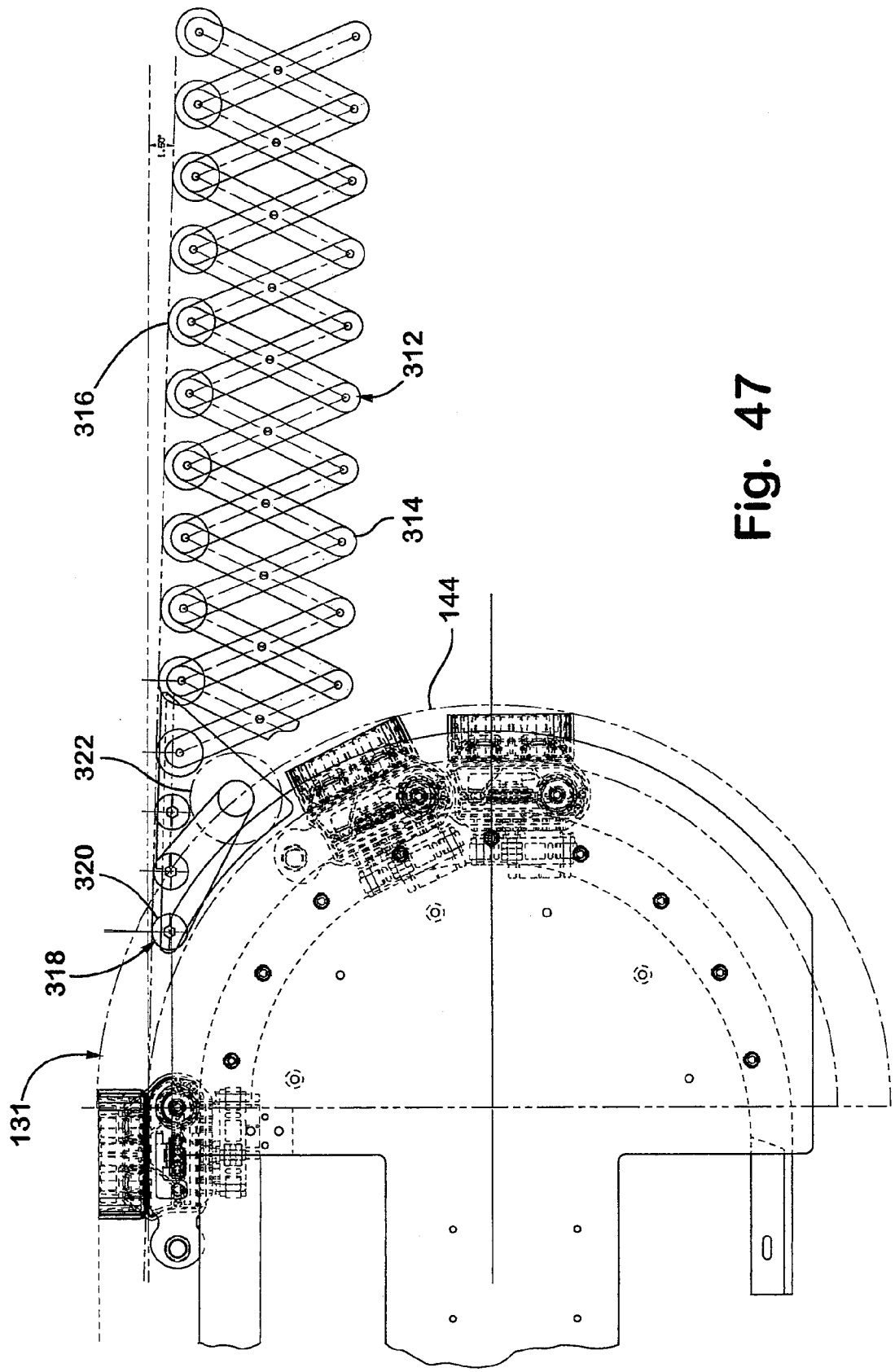
FIG. 47 is a side elevation of a take-away conveyor.
Figure 48:
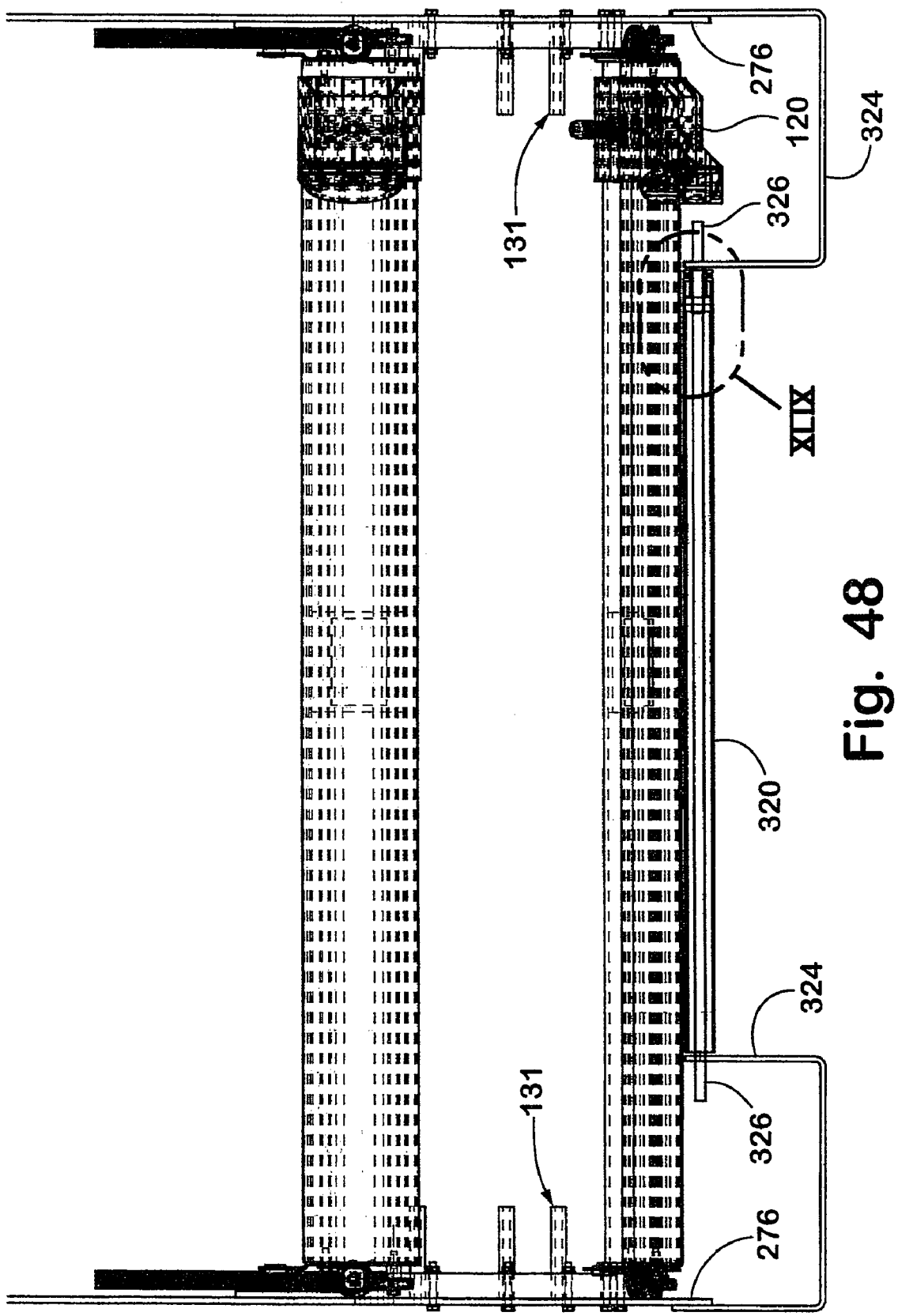
FIG. 48 is a top plan view of the take-away conveyor in FIG. 47.
Figure 49:
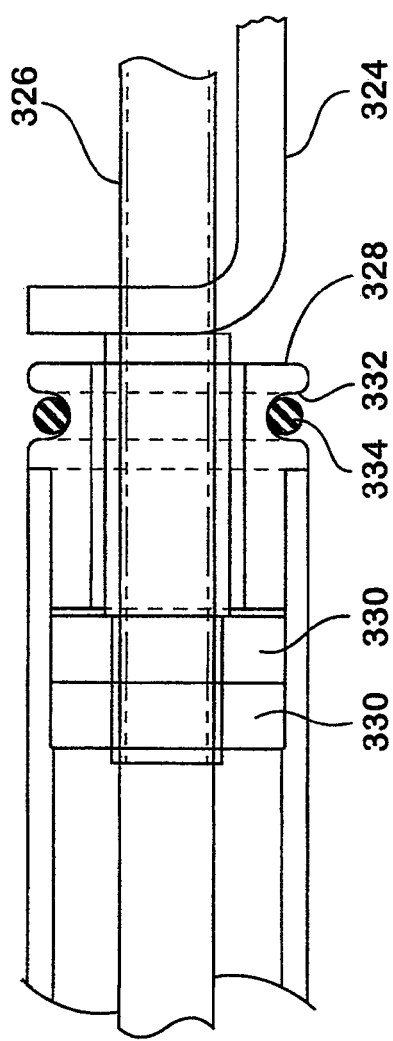
FIG. 49 is an enlarged view of area XLIX in FIG. 48.

Product handling conveyor 312 may include an inner powered roller 320 which is driven by a motor 322 such as through an o-ring or other power transfer member. Motor 322, as illustrated, operates both the innermost power roller and the next outermost roller in the direction of rotation of web 12 in order to provide a pair of powered rollers. The purpose of powered roller 320 is in order to ensure that product, especially small product, does not get impeded by engaging a side of the roller. Thus, a product engaging a side of powered roller 320 will tend to be pulled up onto the powered roller by the rotation of the roller, which as illustrated in FIG. 47 is clockwise. Although illustrated as a freely rotating roller driven by a separate motor, powered roller 320 may also be driven through a motor that is internal to roller 320, as is known in the art.

Flexible body inner end 318 is moveable with the take-up assemblies by way of a pair of brackets 324 which are fastened to a portion of both take-up assemblies such as the support 276. Alternatively, some other technique, such as a biasing of the flexible body against the conveying surface 11 or some other electrical positioning control, may be utilized to cause inner end 318 to move with the take-up assemblies. Bracket 324 provides a mount for powered roller 320 as well as one or more of the other rollers of flexible body 314. In this manner, as the take-up assemblies move, the powered roller 320 will remain in close proximity to conveying surface 11 and flexible body 314 will be repositioned to accommodate the movement of powered roller 320 with respect to a fixed position take-away, such as a conveyor, chute, or the like (not shown), at a discharge end of flexible body 314. Powered roller 320 includes a shaft 326 which engages an opening in the corresponding bracket 324. In the illustrative embodiment, shaft 326 passes entirely through the power roller but may, alternatively, be a stub-axle at each end of the roller. In the illustrative embodiment, an outer support cartridge 328 includes a pair of bearings 330 and a groove 332 for accepting a drive ring 334 which is driven by motor 322. In the illustrative embodiments, brackets 324 are enlarged. The purpose of this enlargement is in order to accommodate movement of pusher shoes 126 as they pass around the end of the web.

FIG. 50 illustrates the manner in which powered roller 320, and hence product-handling conveyor 312, may be able to move within a range in unison with the take-up assemblies out of a perfectly lateral orientation perpendicular to the side rails 150. In the illustrative embodiment, the lower bracket 324 is shown offset from the upper bracket 324 by an offset dimension OF. The powered roller 320 may be angled, or skewed, with respect to the normal position by an angle beta. In the illustrative embodiment, an offset OF of six inches or more and a skew angle of eight degrees or more may be accommodated. In certain applications, an offset OF of up to twelve inches or more and a skew angle of up to thirteen degrees or more may be accommodated. Other parameters will be established according to the particular application. However, the ability to achieve such offsets and skews is especially helpful for extremely long sorter conveying surfaces which are subject to a greater degree of adjustment to the web resulting in independent movement of the take-up assemblies. In the illustrative embodiment, product-handling conveyor 312 is a take-away conveyor. This is because the take-up assemblies are at the discharge end of the sortation apparatus. However, if the take-up assemblies are positioned at the feed end of the sortation apparatus, then product-handling conveyor 312 may be a feed conveyor. Likewise, although conveying surface 316 is illustrated as a gravity roller system, other techniques may be utilized, such as powered rollers or a mesh, or the like, in order to provide a powered conveying surface. In the illustrative embodiment, flexible body 314 is commercially available and marketed by Nestaflex under Model 275.

Changes and modifications in the specifically described embodiments can be carried out without departing from the principles of the invention which is intended to be limited only by the scope of the appended claims, as interpreted according to the principles of patent law including the doctrine of equivalents.

We claim:

1. A positive displacement sorter apparatus, comprising:
   a plurality of interconnected slats defining an endless traveling web, an upper run of said web defining a first conveying surface traveling in a longitudinal direction, a web end portion of said web being extendable and contractible in said longitudinal direction;
   a plurality of pusher shoes, each moving along at least one of said slats to laterally displace an article on said conveying surface; and
   a product handling conveyor at said web end portion, said product handling conveyor having a second conveying surface traveling in said longitudinal direction, wherein said second conveying surface adapted to supply product to or receive product from said first conveying surface, wherein said product handling conveyor having a conveyor end portion, wherein said conveyor end portion being adjacent said web end portion and being moveable with extension and contraction of said web end portion, wherein said first and second conveying surfaces maintain a constant relative relationship.

2. The sorter apparatus of claim 1 including a linear motor propulsion system for said web.

3. The sorter apparatus of claim 2, wherein said linear motor propulsion system is chosen from one of a synchronous linear motor system and a non-synchronous linear motor system.

4. A positive displacement sorter apparatus, comprising:
   a plurality of interconnected slats defining an endless traveling web, an upper run of said web defining a first conveying surface traveling in a longitudinal direction, a web end portion of said web being extendable and contractible in said longitudinal direction;
   a plurality of pusher shoes, each moving along at least one of said slats to laterally displace an article on said conveying surface; and
   a product handling conveyor at said web end portion, said product handling conveyor having a second conveying surface traveling in said longitudinal direction, said second conveying surface adapted to supply product to or receive product from said first conveying surface, wherein said product handling conveyor having a conveyor end portion, wherein said conveyor end portion being adjacent said web end portion and being moveable with extension and contraction of said web end portion, wherein said first and second conveying surfaces maintain a constant relative relationship;
   wherein said second conveying surface comprises a powered conveying surface.

5. The sorter apparatus of claim 4, wherein said powered conveying surface comprises a powered mesh.

6. The sorter apparatus of claim 4, wherein said powered conveying surface comprises at least one powered roller.

7. The sorter apparatus of claim 6, wherein said at least one powered roller includes an internal motor.

8. The sorter apparatus of claim 4 including a linear motor propulsion system for said web.

9. The sorter apparatus of claim 8, wherein said linear motor propulsion system is chosen from one of a synchronous linear motor system and a non-synchronous linear motor system.

10. A positive displacement sorter apparatus, comprising:
    a plurality of interconnected slats defining an endless traveling web, an upper run of said web defining a first conveying surface traveling in a longitudinal direction, a web end portion of said web being extendable and contractible in said longitudinal direction;

a plurality of pusher shoes, each moving along at least one of said slats to laterally displace an article on said conveying surface; and a product handling conveyor at said web end portion, said product handling conveyor having a second conveying surface traveling in said longitudinal direction, said second conveying surface adapted to supply product to or receive product from said first conveying surface, wherein said product handling conveyor having a conveyor end portion, wherein said conveyor end portion being adjacent said web end portion and being moveable with extension and contraction of said web end portion, wherein said first and second conveying surfaces maintain a constant relative relationship;

wherein said second conveying surface comprises a gravity conveying surface.

11. The sorter apparatus of claim 10, wherein said second conveying surface comprises gravity rollers.

12. The sorter apparatus of claim 10, wherein said product handling conveyor comprises a body supporting said second conveying surface.

13. The sorter apparatus of claim 12, wherein said body comprises a flexible body.

14. The sorter apparatus of claim 10 including a linear motor propulsion system for said web.

15. The sorter apparatus of claim 14, wherein said linear motor propulsion system is chosen from one of a synchronous linear motor system and a non-synchronous linear motor system.

16. A positive displacement sorter apparatus, comprising:

a plurality of interconnected slats defining an endless traveling web, an upper run of said web defining a first conveying surface traveling in a longitudinal direction, a web end portion of said web being extendable and contractible in said longitudinal direction;

a plurality of pusher shoes, each moving along at least one of said slats to laterally displace an article on said conveying surface;

a product handling conveyor at said web end portion, said product handling conveyor having a second conveying surface traveling in said longitudinal direction, said second conveying surface adapted to supply product to or receive product from said first conveying surface, wherein said product handling conveyor having a conveyor end portion, wherein said conveyor end portion being adjacent said web end portion and being moveable with extension and contraction of said web end portion, wherein said first and second conveying surfaces maintain a constant relative relationship; and a frame supporting said traveling web, said frame having a stationary portion and a moveable portion, wherein said web end portion being extendable and contractible with movement of said moveable portion.

17. The sorter apparatus of claim 16 including at least one bracket, said at least one bracket mechanically coupling said conveyor end portion with said moveable portion of said frame.

18. The sorter apparatus of claim 16, wherein said conveyor end portion is biased against said moveable portion of said frame.

19. The sorter apparatus of claim 16 including an electrical positioning control, said electrical positioning control maintaining constant relative relationship between said conveyor end portion and said moveable portion of said frame.

20. The sorter apparatus of claim 16, wherein said moveable portion defines at least one take-up assembly, said at least one take-up assembly accommodating expansion and contraction of said web while maintaining generally constant tension on said endless web.

21. The sorter apparatus of claim 20, wherein said at least one take-up assembly comprises a plurality of take-up assemblies, said plurality of take-up assemblies being separately moveable, wherein said conveyor end portion being separately moveable with said plurality of take-up assemblies, wherein said first and second conveying surfaces maintain a constant relative relationship.

22. The sorter apparatus of claim 16 including a linear motor propulsion system for said web.

23. The sorter apparatus of claim 22, wherein said linear motor propulsion system is chosen from one of a synchronous linear motor system and a non-synchronous linear motor system.

* * * * *